(12) United States Patent
Onose et al.

(10) Patent No.: US 9,095,924 B2
(45) Date of Patent: Aug. 4, 2015

(54) WELDED CONSTRUCTION AND RESISTANCE WELDING METHOD

(75) Inventors: Shin Onose, Naka (JP); Keiji Kawahara, Hitachinaka (JP); Hiroshi Fujimoto, Hitachinaka (JP); Kenta Hasegawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 670 days.

(21) Appl. No.: 13/326,787

(22) Filed: Dec. 15, 2011

(65) Prior Publication Data

US 2012/0156561 A1 Jun. 21, 2012

(30) Foreign Application Priority Data

Dec. 16, 2010 (JP) .................. 2010-280493

(51) Int. Cl.
*B23K 11/14* (2006.01)
*B23K 11/20* (2006.01)
(52) U.S. Cl.
CPC .................. *B23K 11/14* (2013.01); *B23K 11/20* (2013.01); *Y10T 428/12389* (2015.01)
(58) Field of Classification Search
CPC ................................ B23K 11/14; B23K 11/18
See application file for complete search history.

(56) References Cited

U.S. PATENT DOCUMENTS

| 5,283,413 A * | 2/1994 | Favre-Tissot ................... 219/93 |
| 2006/0070981 A1 | 4/2006 | Aoyama et al. |
| 2006/0081563 A1 | 4/2006 | Ueda et al. |
| 2009/0302009 A1 | 12/2009 | Sigler et al. |
| 2013/0020301 A1 * | 1/2013 | Onose et al. ................... 219/148 |

FOREIGN PATENT DOCUMENTS

| CN | 1448241 A | 10/2003 |
| CN | 1708374 A | 12/2005 |
| CN | 1810437 A | 8/2006 |
| JP | 2000-126871 A | 5/2000 |
| JP | 2006-32072 A | 2/2006 |
| JP | 2006-164713 A | 6/2006 |
| JP | 2007-194035 A | 8/2007 |
| JP | 2011-212735 A | 10/2011 |
| WO | WO 2011125649 A1 * | 10/2011 |

OTHER PUBLICATIONS

Chinese-language Office Action dated Dec. 4, 2013 (seven (7) pages).
Japanese-language Office Action dated Jan. 14, 2014 (three (3) pages).

* cited by examiner

*Primary Examiner* — Adam Krupicka
(74) *Attorney, Agent, or Firm* — Crowell & Moring LLP

(57) ABSTRACT

A welded construction according to the present invention has a first metallic member, on one surface of which a projecting portion is formed and on the other surface of which a depressed portion corresponding to the projecting portion is formed, and a second metallic member are welded together at a welded portion which includes a summit portion of the projecting portion; wherein, on at least one of the first metallic member and the second metallic member, on its opposite surface to its surface that faces the other one of the metallic members, a recessed portion is formed that is recessed from its peripheral region towards a region which corresponds to the welded portion.

12 Claims, 31 Drawing Sheets

# WELDED CONSTRUCTION AND RESISTANCE WELDING METHOD

The disclosure of the following priority application is hereby incorporated herein by reference: Japanese Patent Application No. 2010-280493, filed Dec. 16, 2010.

BACKGROUND OF THE INVENTION

1. Field of the Invention

The present invention relates to a welded construction and to a method of resistance welding.

2. Description of the Related Art

Resistance welding is per se known as a method of locally welding together two metallic members. Resistance welding is a method of welding by flowing an electrical current through portions where the members are to be welded together and thus generating Joule heat, while at the same time pressing the members together.

In order to locally concentrate the electrical current that flows in the members to the portions to be welded, the contact area is made to be small for achieving higher electrical current density. Due to this, a portion projecting point-wise or line-wise is normally provided on one of the metallic members to be welded, so that point contact or line contact thereof can be established with the other metallic member.

In this case, during resistance welding, with the metallic members that are to be welded together being contacted together at the projecting portion, positive and negative welding electrodes are respectively pressed against the surfaces of the two metallic members opposite to their surfaces that are to be welded together.

There is a method of construction in which, when forming the projecting portion upon the metallic member, the portion of the metallic member where the projecting portion is formed is made thicker than the surrounding region. However, with this construction, the efficiency of material utilization is poor.

Thus, a method is known of using a plate shaped metallic member, and of forming the projecting portion by pressing (for example, refer to Japanese Laid-Open Patent Publication 2006-032072). By doing this, it is possible to enhance the efficiency of material utilization, thus reducing the cost.

SUMMARY OF THE INVENTION

As described above, when performing resistance welding, with the metallic members that are to be welded together being contacted together at the projecting portion, the positive and negative welding electrodes are respectively pressed against the surfaces of the two metallic members opposite to their surfaces that are to be welded together (i.e. against their exterior surfaces). However, in any of the above described prior art methods, due to the application of pressure by the welding electrodes, a stress concentration is established in the metallic member facing and contacting the projecting portion in its side portion that contacts against the projecting portion. Due to this, curving of this metallic member occurs in its side that faces the projecting portion, and its region surrounding the projecting portion rise upwards towards the other member.

Since this type of curving occurs, on the outer surface of this metallic member on its side opposite to its portion that contacts the projecting portion, the end surface of the corresponding welding electrode only contacts the center region where no curving takes place, in other words only contacts a region of small area that corresponds to the projecting portion. In other words, the area where electrical current can pass becomes undesirably small. Due to this, the density of the electrical current that flows into the metallic member becomes high and the amount of heat that is locally generated in this region becomes great, and the welded portion may thereby be damaged so that it may become impossible to ensure an adequate connection force, or the molten portion of the metallic member may adhere to the welding electrode and may damage the welding electrode.

According to the 1st aspect of the present invention, a welded construction in which a first metallic member, on one surface of which a projecting portion is formed and on the other surface of which a depressed portion corresponding to the projecting portion is formed, and a second metallic member are welded together at a welded portion which includes a summit portion of the projecting portion, wherein, on at least one of the first metallic member and the second metallic member, on its opposite surface to its surface that faces the other one of the metallic members, a recessed portion is formed that is recessed from its peripheral region towards a region which corresponds to the welded portion.

According to the 2nd aspect of the present invention, in a welded construction according to the 1st aspect, it is preferred that the first metallic member and the second metallic member have different resistance values, and a metallic member in which the recessed portion is formed has a larger resistance value than the other metallic member.

According to the 3rd aspect of the present invention, in a welded construction according to the 1st or 2nd aspect, it is preferred that the recessed portion is formed around the depressed portion of the one metallic member in which the depressed portion is formed.

According to the 4th aspect of the present invention, in a welded construction according to the 3rd aspect, it is preferred that, on the other metallic member, a region that corresponds to the welded portion on its side opposite to its side that faces the one metallic region is planarized with its surrounding region.

According to the 5th aspect of the present invention, in a welded construction according to the 3rd aspect, it is preferred that, on the other metallic member, a region that corresponds to the welded portion on its side opposite to its side that faces the one metallic region is a recessed portion that is recessed from its surrounding region.

According to the 6th aspect of the present invention, in a welded construction according to any one of the 1st through 5th aspects, it is preferred that the recessed portion has a cone-shape.

According to the 7th aspect of the present invention, in a welded construction according to any one of the 1st through 5th aspects, it is preferred that the recessed portion has a hemispherical- or dome-shape.

According to the 8th aspect of the present invention, in a welded construction according to any one of the 1st through 5th aspects, it is preferred that the recessed portion has a groove-shape of constant width and predetermined length.

According to the 9th aspect of the present invention, in a welded construction according to any one of the 1st through 5th aspects, it is preferred that the recessed portion has a rectangular-shape.

According to the 10th aspect of the present invention, in a welded construction according to the 8th aspect, it is preferred that the recessed portion has a shallow groove-shape with a circular cross section.

According to the 11th aspect of the present invention, in a welded construction according to the 8th or 10th aspect, it is preferred that the depressed portion has a groove-shape of constant width and predetermined length and of angle-shape in cross section.

According to the 12th aspect of the present invention, in a welded construction according to any one of the 1st through 11th aspects, it is preferred that the first metallic member is made from copper, and the second metallic member is made from nickel.

According to the 13th aspect of the present invention, in a welded construction according to any one of the 1st through 12th aspects, it is preferred that the first metallic member is an electrode collector plate of a secondary cell, and the second metallic member is a power lead that is disposed between a casing of the secondary cell and the electrode collector plate.

According to the 14th aspect of the present invention, a resistance welding method in which a first metallic member, on one surface of which a projecting portion is formed and on the other surface of which a depressed portion corresponding to the projecting portion is formed, and a second metallic member are pressed together with a positive electrode and a negative electrode, and welding is performed at a welded portion which includes a summit portion of the projecting portion; wherein, on at least one of the first metallic member and the second metallic member, on its opposite surface to its surface that faces the other metallic member, a recessed portion is formed that is recessed from its peripheral region towards a region which corresponds to the welded portion, and, during resistance welding, welding is performed without contacting at least one of the recessed portions against the positive electrode or the negative electrode.

BRIEF DESCRIPTION OF THE DRAWINGS

FIG. 21A is an enlarged sectional view of a metallic member, and FIG. 21B is an external perspective view of that metallic member;

FIG. 22A is an enlarged sectional view of a metallic member, and FIG. 22B is an external perspective view of that metallic member;

FIG. 23A is an enlarged sectional view of a metallic member, and FIG. 23B is an external perspective view of that metallic member;

FIG. 24A is an enlarged sectional view of a metallic member, and FIG. 24B is an external perspective view of that metallic member;

FIG. 25A is an enlarged sectional view of a metallic member, and FIG. 25B is an external perspective view of that metallic member;

FIG. 26A is an enlarged sectional view of a metallic member, and FIG. 26B is an external perspective view of that metallic member;

DESCRIPTION OF THE PREFERRED EMBODIMENTS

Embodiment 1

Overall Structure of a Secondary Cell

In the following, the welded construction and the welding method of the present invention will be explained with reference to the drawings.

First a cylindrical secondary cell to which an embodiment of the welded construction of the present invention is applied will be explained.

Figure 1:
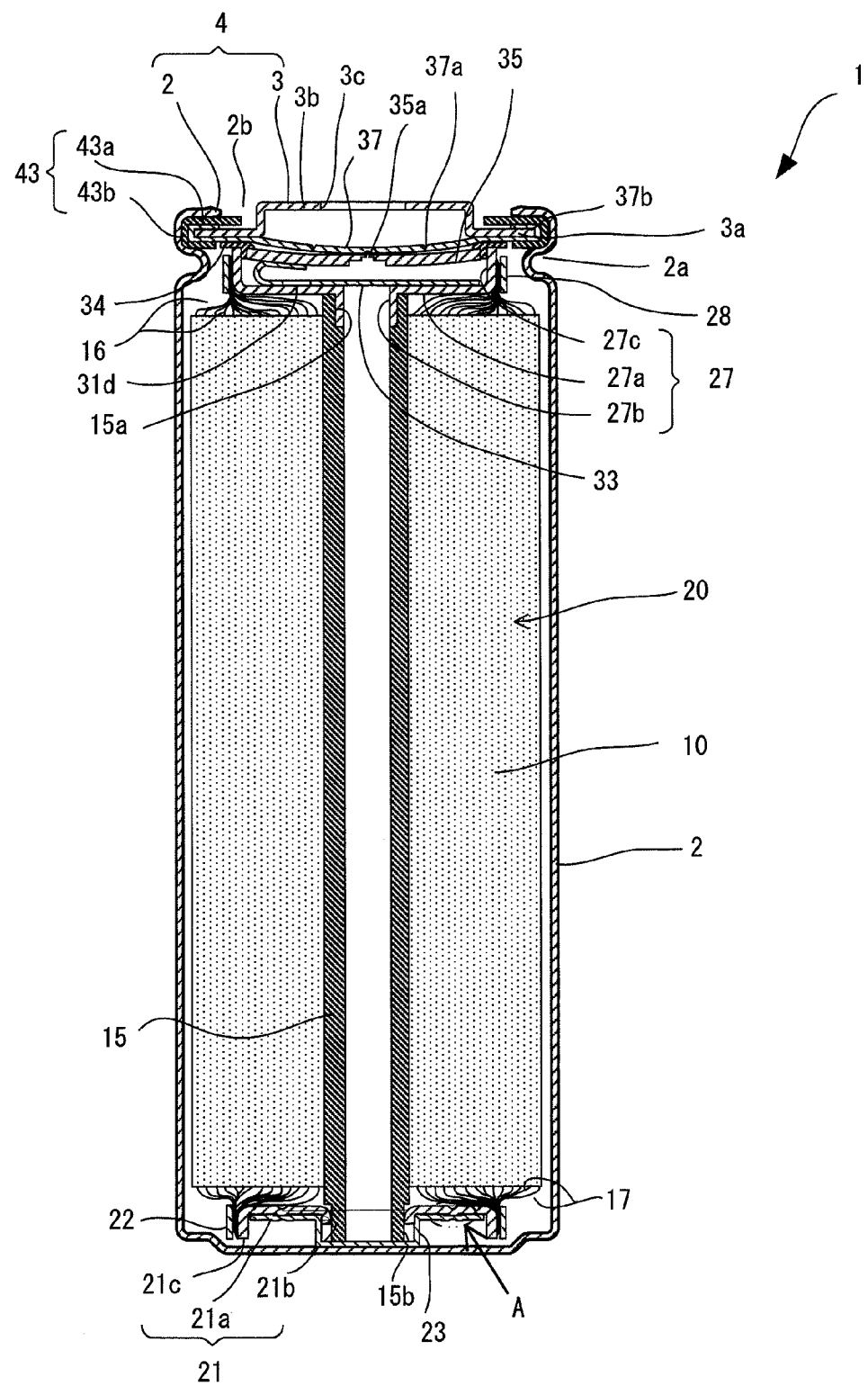
FIG. 1 is a sectional view of a cylindrical secondary cell according to an embodiment of the present invention.
Figure 2:
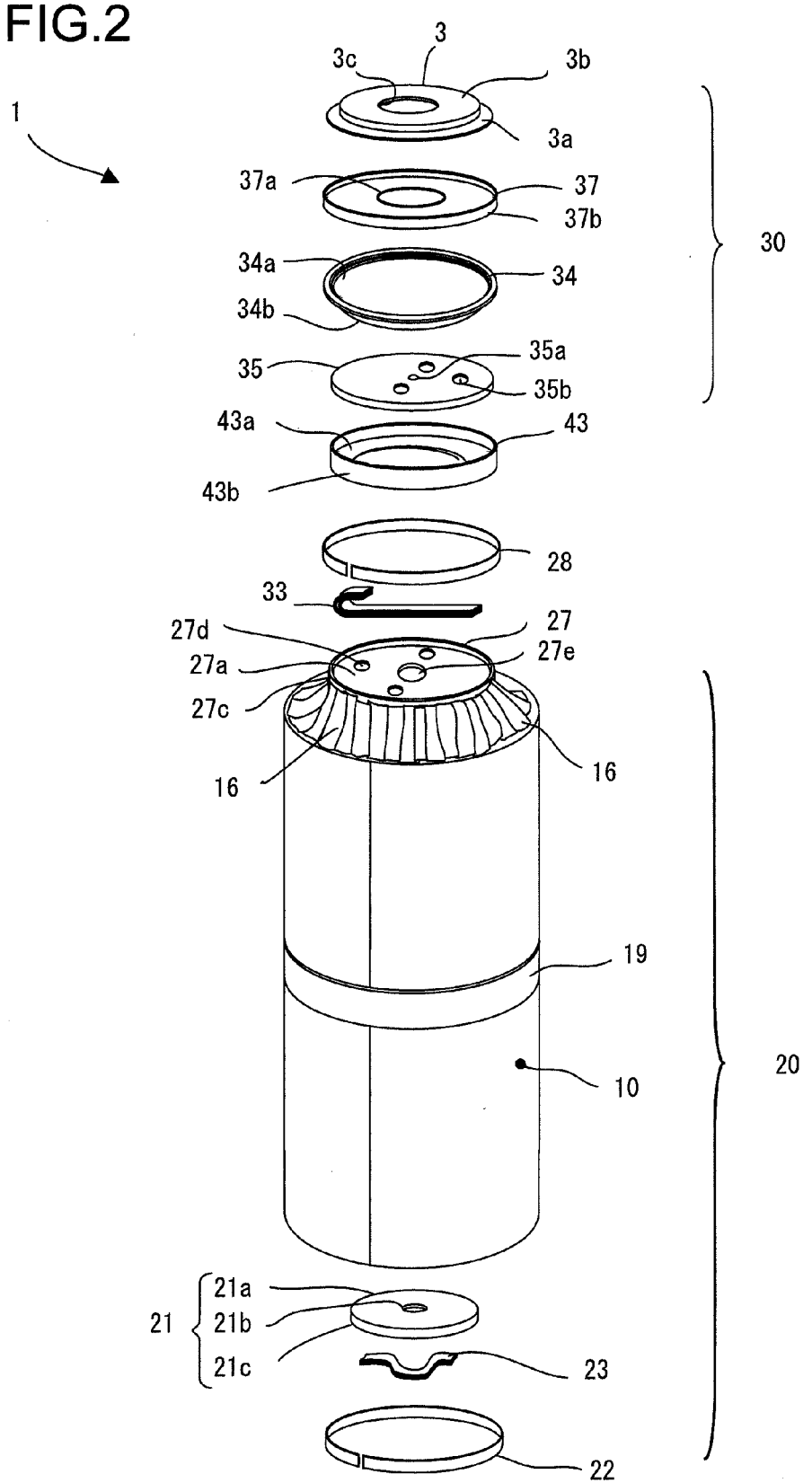
FIG. 2 is an exploded perspective view of the cylindrical secondary cell shown in FIG. 1.

FIG. 1 is a sectional view of a cylindrical secondary lithium ion cell that is an embodiment of the present invention, and FIG. 2 is an exploded perspective view of the cylindrical secondary cell shown in FIG. 1.

The cylindrical secondary cell 1, for example, may be shaped as a cylinder that has an external shape of diameter 40 mm and a height of 100 mm. This cylindrical secondary cell 1 has a cell container that is sealed from the exterior, and that is constructed by performing a swaging process so as to clamp a hat shaped cell lid 3 onto the top of a cylindrical cell casing 2 having a bottom, with the interposition of a sealing member 43 (normally termed a "gasket") between them. The cell casing 2 with a bottom is formed from a metallic plate made from iron, stainless steel, or the like by press processing, with a plated layer made from nickel or the like being formed over its entire inner surface and its entire outer surface. This cell casing 2 has an opening portion 2b at its upper end portion, this being its open end. A groove 2a is formed around this opening portion 2b of the cell casing 2, projecting inwards towards the interior of the cell casing 2. And various structural components for generation of electricity, explained below, are contained within the interior of the cell casing 2.

Figure 3:
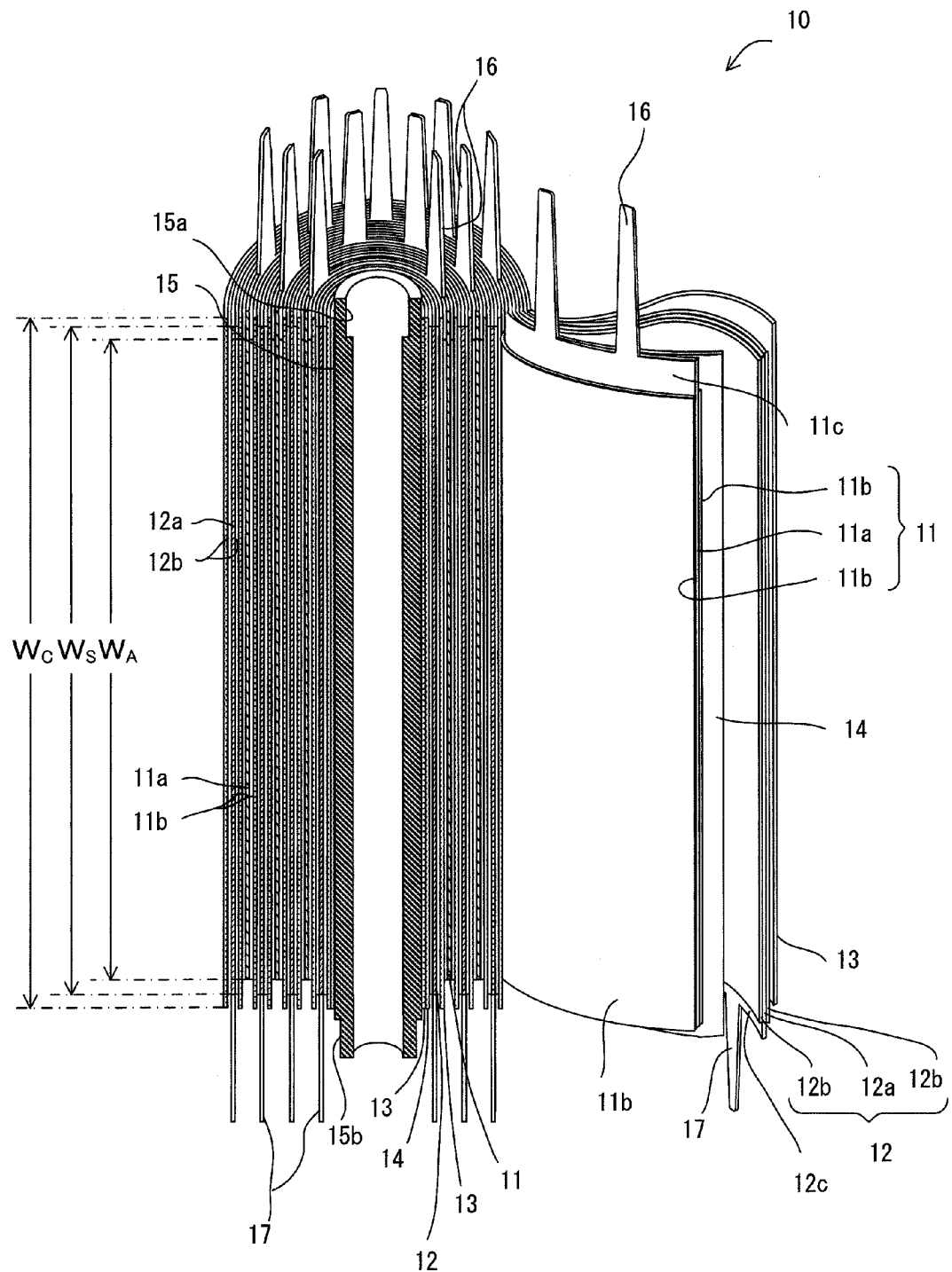
FIG. 3 is a partly cut away exploded perspective view for displaying the details of an electrode group shown in FIG. 1.

The reference symbol 10 denotes an electrode group that has a winding core 15 at its center, and a positive electrode, a negative electrode, and separators are wound around this winding core 15. FIG. 3 shows the detailed construction of the electrode group 10, and is a perspective view showing the electrode group 10 in a state with a portion thereof cut away. As shown in FIG. 3, this electrode group 10 has a structure in which a positive electrode 11, a negative electrode 12, and first and second separators 13 and 14 are wound around the outside of the winding core 15.

Around the winding core 15 that is formed as a hollow cylinder, a negative electrode 12, a first separator 13, a positive electrode 11 and a second separator 14 are laminated in that order, and are wound up. And, inside the innermost winding of the negative electrode 12, the first separator 13 and the second separator 14 are wound around a certain number of times (in FIG. 3, once). Furthermore, the negative electrode 12 appears on the outside, with the first separator 13 being wound around it. And, on the outside, the first separator 13 is held down with adhesive tape 19 (refer to FIG. 2).

The positive electrode 11 is made from aluminum foil and has an elongated shape, and includes a positive electrode sheet 11a and a processed positive electrode portion in which a positive electrode mixture is applied to form a layer 11b on both sides of this positive electrode sheet 11a. The upper side edge of the positive electrode sheet 11a along its longitudinal direction, to both sides of which the positive electrode mixture is not applied and along which the aluminum foil is accordingly exposed, constitutes a positive electrode mixture untreated portion 11c that is not treated with the positive electrode mixture. A large number of positive leads 16 are formed integrally at regular intervals upon this positive electrode mixture untreated portion 11c, and project upwards parallel to the winding core 15.

The positive electrode mixture consists of an active positive electrode material, an electrically conductive positive electrode material, and a positive electrode binder. The active positive electrode material is desirably a lithium metal oxide or a lithium transitional metal oxide. For example, lithium cobalt oxide, lithium manganate, lithium nickel oxide, or a compound lithium metal oxide (that includes two or more sorts of lithium metal oxides selected from the lithium metal oxides based on cobalt, nickel, and manganese) may be suggested. The electrically conductive positive electrode material is not particularly limited, provided that it is a substance that can assist transmission to the positive electrode of electrons that are generated in the positive electrode mixture by a lithium occlusion/emission reaction. However, among the above mentioned active positive electrode materials, a compound lithium metal oxide composed of lithium cobalt oxide, lithium manganate, and lithium nickel oxide may be adopted for preferable characteristics.

The positive electrode binder holds together the active positive electrode material and the electrically conductive positive electrode material, and is also capable of adhering together the layer of positive electrode mixture 11b and the positive electrode sheet 11a, and is not particularly limited, provide that it is not greatly deteriorated by contact with the non-aqueous electrolyte. As an example of a material for this positive electrode binder, polyvinylidene fluoride (PVDF) or fluorine-containing rubber or the like may be suggested. The method of making the positive electrode mixture layer 11b is not particularly limited, provided that it is a method of forming the layer 11b of positive electrode mixture upon the positive electrode. As an example of a method for making the positive electrode mixture 11b, the method may be suggested of applying, onto the positive electrode sheet 11a, a solution in which the substances that make up the positive electrode mixture are dispersed. In this manufacturing method, an active positive electrode material with preferable characteristics may be obtained.

As a method for applying the positive electrode mixture to the positive electrode sheet 11a, a roll coating method, a slit die coating method or the like may be suggested. As a solvent for the solution in which the positive electrode mixture is to be dispersed, for example, it may be added to N-methylpyrrolidone (NMP) or water or the like and kneaded into a slurry, that is then applied uniformly to both sides of an aluminum foil of thickness, for example, 20 µm; and, after drying, this may be cut up by stamping. The positive electrode mixture may be applied, for example, to a thickness of around 40 µm on each side. When the positive electrode sheet 11a is cut out by stamping, the positive leads 16 are formed integrally therewith at the same time. The lengths of all of the positive leads 16 are almost the same.

The negative electrode 12 is made from copper foil and has an elongated shape, and includes a negative electrode sheet 12a and a processed negative electrode portion in which a negative electrode mixture is applied to form a layer 12b on both sides of this negative electrode sheet 12a. Both sides of the lower side edge of the negative electrode sheet 12a along the longitudinal direction, to which the negative electrode mixture is not applied and along which the copper foil is accordingly exposed, constitute a negative electrode mixture untreated portion 12c that is not treated with the negative electrode mixture. A large number of negative leads 17 are formed integrally at regular intervals upon this negative electrode mixture untreated portion 12c, and project in the direction (downwards) opposite to the direction (upwards) in which the positive leads 16 project. With this structure, the electrical current can flow substantially equally dispersed, thus leading to enhancement of reliability of the lithium ion secondary cells.

The negative electrode mixture consists of an active negative electrode material, a negative electrode binder, and a thickener. This negative electrode mixture may also include an electrically conductive negative electrode material such as acetylene black or the like. It is desirable to use graphitic carbon as the active negative electrode material, and it is particularly desirable to use synthetic graphite. However, among these, a negative electrode mixture having excellent characteristics may be obtained by the method described below. By using graphitic carbon, it is possible to manufacture a lithium ion secondary cell that is suitable for a plug-in hybrid vehicle or electric vehicle, for which high capacity is demanded. The method for forming a layer of the negative electrode mixture 12b is not particularly limited, provided that it is a method that can form a layer of the negative electrode mixture 12b upon the negative electrode sheet 12a. As a method for applying the negative electrode mixture to the negative electrode sheet 12a, for example, the method may be suggested of applying upon the negative electrode sheet 12a a solution in which the constituent substances of the negative electrode mixture are dispersed. As the method for application, for example, a roll coating method, a slit die coating method or the like may be suggested.

As a method for applying the negative electrode mixture to the negative electrode sheet 12a, for example, N-methyl-2-pyrrolidone or water may be added to the negative electrode mixture as a dispersal solvent and kneaded into a slurry, that is then applied uniformly to both sides of a rolled copper foil of thickness, for example, 10 μm; and, after drying, this may be cut up by stamping. The negative electrode mixture may be applied, for example, to a thickness of around 40 μm on each side. When the negative electrode sheet 12a is cut out by stamping, the negative leads 17 are formed integrally therewith at the same time. The lengths of all of the negative leads 17 are almost the same.

The width $W_S$ of the first separator 13 and of the second separator 14 is made to be greater than the width $W_C$ of the layer of negative electrode mixture 12b that is formed upon the negative electrode sheet 12a. Moreover, the width $W_C$ of the layer of negative electrode mixture 12b that is formed upon the negative electrode sheet 12a is made to be greater than the width $W_A$ of the layer of positive electrode mixture 11b that is formed upon the positive electrode sheet 11a. By making the width $W_C$ of the layer of negative electrode mixture 12b greater than the width $W_A$ of the layer of positive electrode mixture 11b, it is possible to prevent internal short circuiting due to the deposition of foreign matter. This is done because, in the case of a lithium ion secondary cell, while the lithium that is the active positive electrode material is ionized and permeates the separator, if there is some portion on the negative electrode sheet 12a at which the layer of active negative electrode material 12b is not formed so that the negative electrode sheet 12a is exposed to the layer of positive electrode material 11b, then the lithium therein will be deposited upon the negative electrode sheet 12a, and this can cause an internal short circuit to occur.

It should be understood that the first and second separators 13 and 14 may, for example, be made from perforated polyethylene of thickness 40 μm.

Referring to FIGS. 1 and 3, a stepped portion 15a with a diameter larger than the inner diameter of the winding core 15 is formed on the inner surface of the hollow cylindrical shaped winding core 15 at its upper end portion in the axial direction (the vertical direction in the drawing), and a positive electrode electrical current collecting member 27 is pressed into this stepped portion 15a.

This positive electrode electrical current collecting member 27 may, for example, be made from aluminum, and includes a circular disk shaped base portion 27a, a lower cylindrical portion 27b that projects so as to face towards the winding core 15 at the surface of this base portion 27a facing the electrode group 10 and that is pressed into the inner surface of the stepped portion 15a, and an upper cylindrical portion 27c that projects out towards the cell lid 3 at the outer peripheral edge. Apertures 27d (refer to FIG. 2) are formed in the base portion 27a of the positive electrode electrical current collecting member 27, for allowing the escape of gas generated in the interior of the cell. Furthermore, another aperture 27e is formed in the positive electrode electrical current collecting member 27; the function of this aperture 27e will be described hereinafter. It should be noted that the winding core 15 is made of a material of a type that isolates electrically between the positive electrode electrical current collecting member 27 and the negative electrode electrical current collecting member 21, and that also maintains and enhances the axial rigidity of the cell. In the present embodiment, for example, a glass-fiber reinforced polypropylene is employed as the material for the winding core 15.

All of the positive leads 16 of the positive electrode sheet 11a are welded to the upper cylindrical portion 27c of the positive electrode electrical current collecting member 27. In this case, as shown in FIG. 2, the positive leads 16 are overlapped over one another and joined upon the upper cylindrical portion 27c of the positive electrode electrical current collecting member 27. Since each of these positive leads 16 is very thin, accordingly it is not possible for a large electrical current to be taken out by just one of them. Due to this, the large number of positive leads 16 are formed at predetermined intervals over the total length of the upper edge of the positive electrode sheet 11a from the start of its winding onto the winding core 15 to the end of that winding.

Since the positive electrode electrical current collecting member 27 is oxidized by the electrolyte, its reliability can be enhanced by making it from aluminum. When the aluminum on the front surface is exposed by any type of processing, immediately a coating of aluminum oxide is formed upon that front surface, so that it is possible for further oxidization by the electrolyte to be prevented due to this layer of aluminum oxide.

Moreover, by making the positive electrode electrical current collecting member 27 from aluminum, it becomes possible to weld the positive leads 16 of the positive electrode sheet 11a thereto by ultrasonic welding or spot welding or the like.

The positive leads 16 of the positive electrode sheet 11a and the annular pressure member 28 are welded to the external periphery of the upper cylindrical portion 27 of the positive electrode electrical current collecting member 27. The large number of positive leads 16 are closely clamped against the external peripheral surface of the upper cylindrical portion 27 of the positive electrode electrical current collecting member 27, the pressure member 28 is fitted over the externally oriented surfaces of the positive leads 16 and temporarily fixed there, and then they are all welded together in that state.

A stepped portion 15b whose outer diameter is smaller than the outer diameter of the winding core 15 is formed upon the external peripheral surface of the lower end portion of the winding core 15, and a negative electrode electrical current collecting member 21 is pressed over this stepped portion 15b and thereby fixed thereto. This negative electrode electrical current collecting member 21 may, for example, be made from copper that has a small resistance value, and is formed with a circular disk shaped portion 21a and with an opening portion 21b that is formed in the disk shaped portion 21a and that is pressed over the stepped portion 15b of the winding core 15; and, on its outer peripheral edge, an external circumferential cylindrical portion 21c is formed so as to project facing downwards towards the bottom portion of the cell casing 2.

All of the negative leads 17 of the negative electrode sheet 12a are welded to this external cylindrical portion 21c of the negative electrode electrical current collecting member 21 by ultrasonic welding or the like. Since each of these negative leads 17 is very thin, in order to take out a large electrical current, a large number of them are formed at predetermined intervals over the total length of the lower edge of the negative electrode sheet 12a from the start of its winding onto the winding core 15 to the end of its winding.

The negative leads 17 of the negative electrode sheet 12a and an annular pressure member 22 are welded to the external periphery of the external cylindrical portion 21c of the negative electrode electrical current collecting member 21. The large number of negative leads 17 are closely clamped against the external peripheral surface of the external cylindrical portion 21c of the negative electrode electrical current collecting member 21, the pressure member 22 is fitted over the externally oriented surfaces of the negative leads 17 and temporarily fixed there, and then they are all welded together in that state.

A negative electrode power lead 23 that is made from nickel is connected to the lower surface of the negative electrode electrical current collecting member 21 by resistance welding or the like. In this case, the negative electrode electrical current collecting member 21 and the negative electrode power lead 23 are joined together, when seen in plan view, at a plurality of spots on their peripheries coaxially with the winding core 15. This negative electrode power lead 23 is also welded to the bottom portion of the cell container 2, that is made from a ferrous material.

The cell container 2 may, for example, be made from carbon steel of thickness 0.5 mm, and it is desirable for both its inner surface and its outer surface to be processed by nickel plating. If the negative electrode electrical current collecting member 21 is made from copper whose resistance value is small, then the joining force will be insufficient if the copper and the ferrous material are directly welded together by resistance welding. However, by making the negative electrode power lead 23 from nickel, and by performing nickel plating on the inner surface of the cell casing 2, it becomes possible to weld the negative electrode power lead solidly to the cell casing 2 by resistance welding. Moreover, it becomes possible to weld the negative electrode power lead 23 that is made from nickel and the negative electrode electrical current collecting member 21 that is made from copper together solidly by resistance welding.

The connection construction between the negative electrode electrical current collecting member 21 and the negative electrode power lead 23, and the method of joining them together by resistance welding, are very important features for the present invention, and accordingly the details thereof will be described hereinafter.

The aperture 27e that is formed in the positive electrode electrical current collecting member 27 is for insertion of an electrode rod (not shown in the drawings) for welding the negative electrode power lead 23 to the cell casing 2. In more detail, a welding electrode rod is inserted through the aperture 27e formed in the positive electrode electrical current collecting member 27 down into and through the hollow central axis of the winding core 15, and its tip end portion presses the negative electrode power lead 23 against the inner surface of the bottom portion of the cell casing 2, so that it can be welded by resistance welding. The cell casing 2 that is thus connected via the negative electrode power lead 23 to the negative electrode electrical current collecting member 21 functions as one of the output terminals of this cylindrical secondary cell 1, so that it is possible to take out electrical power accumulated in the electrode group 10 from the cell casing 2.

By the large number of positive leads 16 being welded to the positive electrode electrical current collecting member 27 and the large number of negative leads 17 being welded to the negative electrode electrical current collecting member 21, the positive electrode electrical current collecting member 27, the negative electrode electrical current collecting member 21, and the electrode group 10 are integrated together into the generating unit 20 (refer to FIG. 2). However in FIG. 2, for the convenience of illustration, the negative electrode electrical current collecting member 21, the pressure member 22, and the negative electrode power lead 23 are shown as separated from the generating unit 20.

Furthermore, one end portion of a flexible connection member 33 that is made by laminating together a plurality of layers of aluminum foil is joined to the upper surface of the base portion 27a of the positive electrode electrical current collecting member 27. Since this connection member 33 is made by laminating together and integrating a plurality of layers of aluminum foil, accordingly it is capable of carrying a large electrical current, and moreover it is endowed with flexibility. In other words, while it is necessary to make the thickness of the connection member great in order for it to conduct a high electrical current, if it were to be made from a single metallic plate, then its rigidity would become high, and it would lose its flexibility. Accordingly this connection member 33 is made by laminating together a large number of sheets of aluminum foil each of which is of low thickness, thus preserving its flexibility. The thickness of the connection member 33 may, for example, be 0.5 mm, and it may be made by laminating together 5 sheets of aluminum foil each of thickness 0.1 mm.

An insulation plate 34 that is made from an insulating resin material and that has an opening portion 34a, thus being formed as an annulus, is mounted above the upper cylindrical portion 27c of the positive electrode electrical current collecting member 27. This insulation plate 34 also has a side portion 34b that projects downward from the opening portion 34a (refer to FIG. 2). The connection plate 35 is fitted into the opening portion 34a of the insulation plate 34. The other end portion of the flexible connection member 33 is joined by welding to the lower surface of the connection plate 35.

The connection plate 35 is made from aluminum alloy, and is almost uniform all over except for its central portion; however, its central portion is bent downwards slightly into a lower position, so that it has an almost dished shape. The thickness of this connection plate 35 may be, for example, around 1 mm. A projecting portion 35a that is made in a shallow dome shape is formed at the center of the connection plate 35, and a plurality of apertures 35b (refer to FIG. 2) are formed around the projecting portion 35a. These apertures 35b have the function of allowing escape of gas generated in the interior of the cell due to overcharging or the like.

This projecting portion 35a of the connecting plate 35 is joined to the central portion of the bottom surface of the diaphragm 37 by resistance welding or friction stir welding. This diaphragm 37 is made from aluminum alloy, and a circular groove 37a is provided around the central portion of the diaphragm 37. The groove 37a is made by squashing the upper surface of the diaphragm 37 into a letter-U shape by pressing, so that the remaining portion is very thin.

The diaphragm 37 is provided in order to ensure the safety of the cell: if the pressure of gas generated in the interior of the cell rises, then at a first stage this diaphragm 37 bends somewhat upwards, and its junction to the projecting portion 35a of the connection plate 35 becomes detached and it separates from the connection plate 35, so that its electrical continuity with the connection plate 35 is broken. If the pressure internal to the cell still continues to rise, then at a second stage the groove 37a ruptures, and this functions to vent the gas internal to the cell and thus positively to reduce the internal pressure.

At its peripheral portion, the diaphragm 37 is fixed to a peripheral portion 3a of the lid member 3. As shown in FIG. 2, the diaphragm 37 has a side portion 37b at its edge portion that, initially, stands up vertically towards the cell lid 3. The cell lid 3 is placed within this side portion 37b, and then, by a swaging process, the side portion 37b is bent over towards the upper surface of the cell lid 3, and clamps the cell lid 3 in position.

The cell lid 3 is made from a ferrous metal such as carbon steel or the like, and nickel plated layers are formed on both its exterior surface and its interior surface. Moreover, the cell lid 3 has a hat shape that includes a circular disk shaped peripheral part 3a contacted to the diaphragm 37 and a top portion 3b that projects upwards from this peripheral part 3a. An aperture 3c is formed in the cylindrical portion 3b. This aperture 3c is for allowing gas that has been generated internally to the cell to vent and escape to the exterior, when the pressure of this gas internal to the cell has ruptured the diaphragm 37 as described above.

It should be understood that, if the lid member is made from a ferrous metal, then, when this cylindrical secondary cell is to be joined in series with another cylindrical secondary cell of the same type that is also made from a ferrous metal, it is possible to join them together by spot welding.

The cell lid 3, the diaphragm 37, the insulation plate 34, and the connection plate 35 together constitute an integrated cell lid unit 30. A method of assembly for this cell lid unit 30 will now be described.

First, the cell lid 3 is fixed to the diaphragm 37. This fixing together of the diaphragm 37 and the cell lid 3 is performed by swaging or the like. Since initially the side portion 37b of the diaphragm 37 is formed as perpendicular to its base portion 37a, as shown in the figure, accordingly the peripheral part 3a of the cell lid 3 can be fitted in within the side portion 37b of the diaphragm 37. And then the side portion 37b of the diaphragm 37 is deformed by being pressed inwards or the like, so that it is pressed into contact with and covers the upper and lower surfaces of the peripheral part of the cell lid 3 as well as its external circumferential edge.

On the other hand, the connection plate 35 is fitted into the aperture 34a of the insulation plate 34. Next, in the state in which the insulation plate 34 is sandwiched thereby, the projecting portion 35a of the connection plate 35 is welded to the bottom surface of the diaphragm 37 to which the cell lid 3 is fixed. As the method of welding in this case, resistance welding or friction stir welding may be employed. By doing this, the connection plate 35 is welded to the diaphragm 37 that is fixed by the cell lid 3 with the interposition of the insulation plate between them, and thereby the integrated cell lid unit 30 is manufactured.

As described above, the connection plate 35 of the cell lid unit 30 is connected to the positive electrode electrical current collecting member 27 by the connection member 33. Accordingly, the cell lid 3 is connected to the positive electrode electrical current collecting member 27. In this manner, the cell lid 3 that is connected to the positive electrode electrical current collecting member 27 operates as the other output terminal of this secondary cell, so that it becomes possible to output electrical power accumulated by the electrode group 10 from the cell casing 2 that operates as one output terminal of the secondary cell and the cell lid 3 that operates as its other output terminal.

A sealing member 43, normally termed a "gasket", is provided so as to cover the edge portion of the side portion 37b of the diaphragm 37. This sealing member 43 is made from rubber, although this is not intended to be limitative; an example of one possible material that may be employed is ethylene propylene copolymer (EPDM). Furthermore, for example, the cell casing 2 may be made of carbon steel plate of thickness 0.5 mm and its external diameter may be 40 mm, while the thickness of the sealing member 43 may be around 1.0 mm.

Initially, as shown in FIG. 2, this sealing member 43 has a shape that includes as annular base portion 43a and an external peripheral wall portion 43b that is formed on the outer circumferential edge of this annular base portion 43a so as to stand almost vertically upwards.

And swage processing is performed by pressing or the like, so as to bend down the external peripheral wall portion 43b of the gasket 43 along with the cell casing 2, and thereby the diaphragm 37 and the cell lid 3 are pressed into contact along the axial direction by the base portion 43a and the external peripheral wall portion 43b. Due to this, the cell lid 3, the diaphragm 37, the insulation plate 34, and the connection plate 35 are integrated together into the cell lid unit 30, and this is fixed to the cell casing 2 with the interposition of the sealing member 43.

A predetermined amount of a non-aqueous electrolyte is injected into the interior of the cell container 2. A solution of a lithium salt dissolved in a carbonate series solvent is a preferred example of such a non-aqueous electrolyte that may be used. Examples that may be cited of lithium salts are lithium hexafluorophosphate ($LiPF_6$), lithium tetrafluoroborate ($LiBF_4$), and so on. Furthermore, examples that may be cited of carbonate series solvents are ethylene carbonate (EC), dimethyl carbonate (DMC), propylene carbonate (PC), methyl-ethyl carbonate (MEC), mixtures of two or more solvents selected from the above, and so on.

The Welded Construction

Next, the welded construction that connects the negative electrode electrical current collecting member 21 and the negative electrode conducting lead 23 will be explained.

Figure 4:
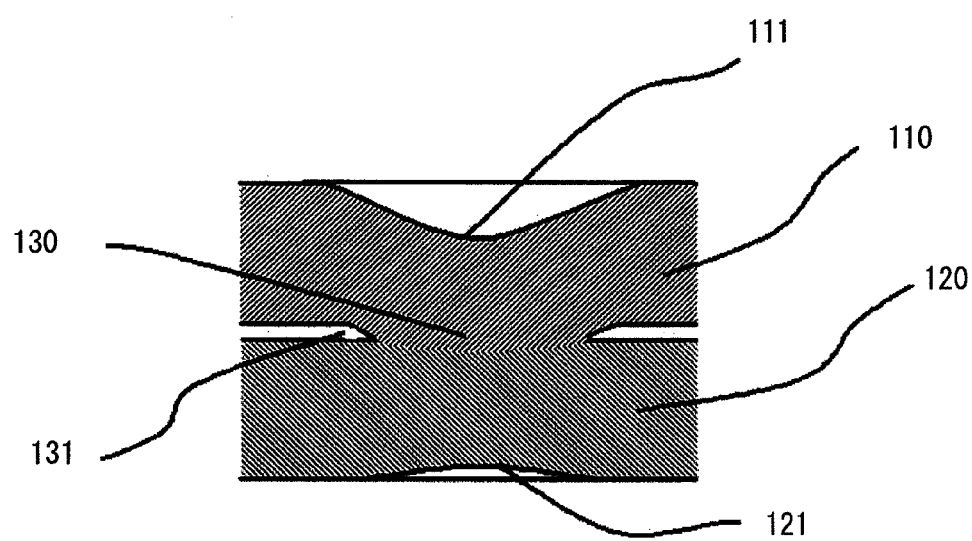
FIG. 4 is an enlarged sectional view of a portion A of the cylindrical secondary cell shown in FIG. 1, particularly showing a welded construction that is an embodiment of the present invention.

FIG. 4 is an enlarged sectional view of the portion A of FIG. 1. In FIG. 4, only one of a plurality of connection spots is shown. It should be understood that the welded construction and the welding method by resistance welding of the present invention should not be considered as being limited to the welding together of the negative electrode electrical current collecting member 21 and the negative electrode power lead 23; these aspects of the present invention can be applied generally and widely. Due to this, in the following explanation, one of the negative electrode electrical current collecting member 21 and the negative electrode power lead 23 will be described as being the "one metallic member 110", while the other thereof will be described as being the "other metallic member 120".

The one metallic member 110 and the other metallic member 120 are joined together by welding at the welded portion 130. On the one metallic member 110, a depressed portion 111 that is depressed from the surface and that corresponds to the welded portion 130 is formed on the opposite surface thereof to the welded portion 130. And, on the other metallic member 120, a concaved portion 121 that is depressed from the surface and that corresponds to the welded portion 130 is formed on the opposite surface thereof to the welded portion 130. The depressed portion 111 and the concaved portion 121 have cross sectional shapes that are conical or dish shaped, and, in plan view, are shaped in ring shapes concentric with the welded portion 130. The mutually opposing surfaces of the one metallic member 110 and of the other metallic member 120 around the periphery of the welded portion 130 are somewhat separated, so that a gap 131 is defined between them.

As one desirable example that may be cited, the one metallic member 110 may be made from copper, while the other metallic member 120 is made from nickel.

Figure 5:
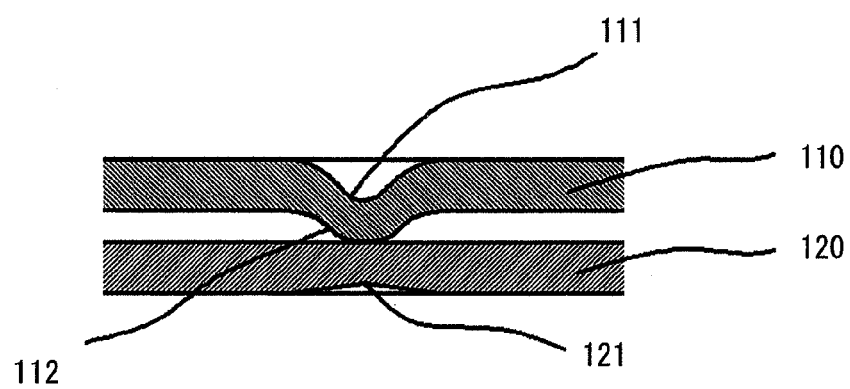
FIG. 5 is an enlarged sectional view of metallic members before welding, for explanation of a method by which the components for the welded construction shown in FIG. 4 may be formed.

FIG. 5 is an enlarged sectional view for explanation of a method of forming the welded construction shown in FIG. 4.

Before welding, the one metallic member 110 is provided with the projecting portion 112. This projecting portion 112 is formed by press processing, and the corresponding depressed portion 111 is made during the formation of the projecting portion 112. The center portion of the projecting portion 112 in the lateral direction (the left to right direction in FIG. 5) is projected highest from the surface of the one metallic member 110, and accordingly the position at which the depth of the depressed portion 111 is maximum is the center portion in the width direction. And the position at which the depth of the concaved portion 121 of the other metallic member 120 is maximum is the portion that corresponds to the center portion of the projecting portion 112 in the lateral direction. It is also acceptable for the maximum depth of the concaved portion 121 to be less than the maximum depth of the depressed portion 111.

Figure 7A:
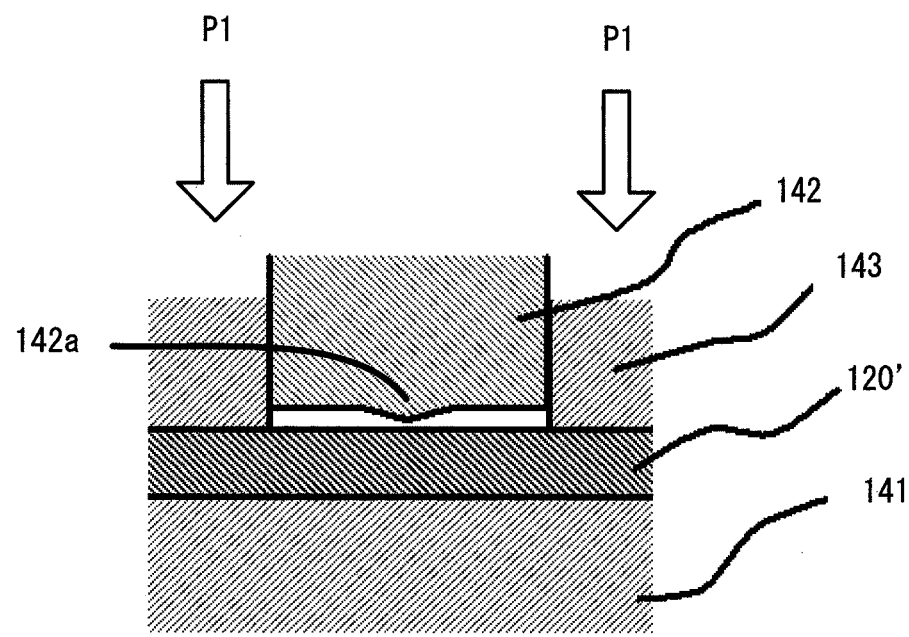
FIGS. 7A and 7B are enlarged sectional views for explanation of a method for forming one of the metallic members shown in FIG. 5.
Figure 7B:
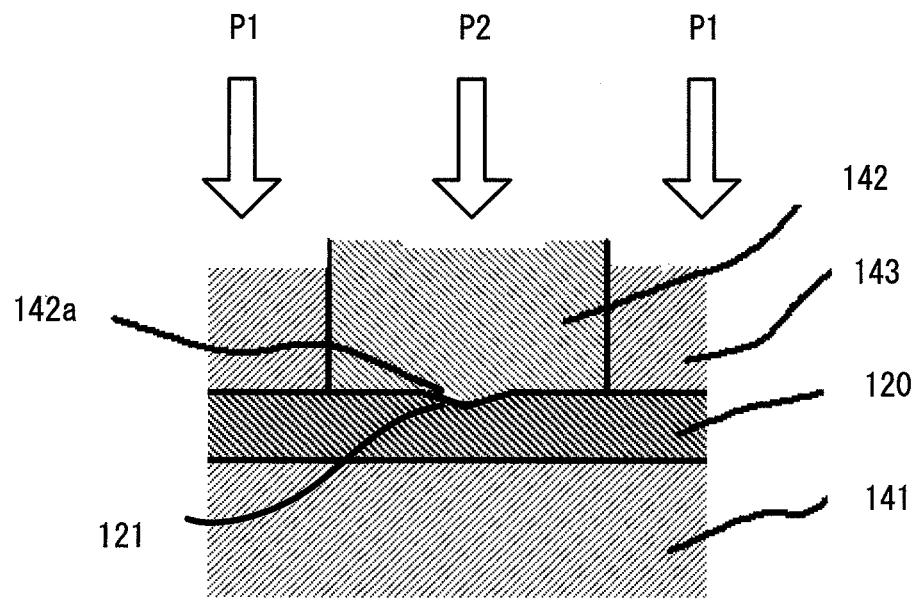

FIGS. 7A and 7B are sectional views for explanation of a method of forming the concaved portion 121 on the other metallic member 120.

As shown in FIG. 7A, a lower die 141 whose upper surface is flat is disposed below the other metallic member 120', this being at this stage in the form of a flat plate. Furthermore, a forming punch 142 having a projection 142a that corresponds to the concaved portion 121 to be formed is disposed above the other metallic member 120'. The portion of the other metallic member 120' around the forming punch 142 is pressed against the lower die 141 by a pressing die 143.

It should be understood that, when a conical concave portion 121 is to be formed on the other metallic member 120, the projection 142a of the forming punch 142 has also a conical shape. And, when a linear groove-shape is to be formed on the other metallic member, the projection 142a has a linear angle-shape. According to the shape of the projection 142a, the concave portion is formed with various shape.

In this case, the pressing force P1 exerted upon the pressing die 143 is of an order that does not plastically deform the other metallic member 120'. In this state, as seen in FIG. 7B, the forming punch 142 is driven so as to exert a pressing force P2 upon the other metallic member 120'. Due to this, the portion of the other metallic member 120' upon which this pressing force P2 is exerted is formed into the concaved portion 121 whose shape corresponds to the shape of the projection 142a of the forming punch 142, and thereby the other metallic member 120 is formed.

Figure 8A:
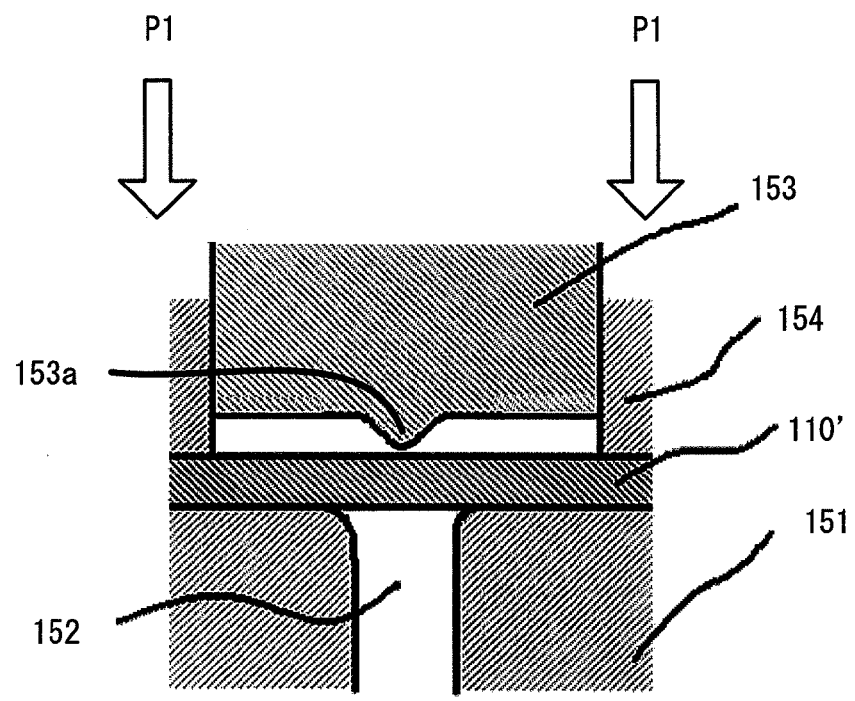
FIGS. 8A and 8B are enlarged sectional views for explanation of a method for forming another of the metallic members shown in FIG. 5.
Figure 8B:
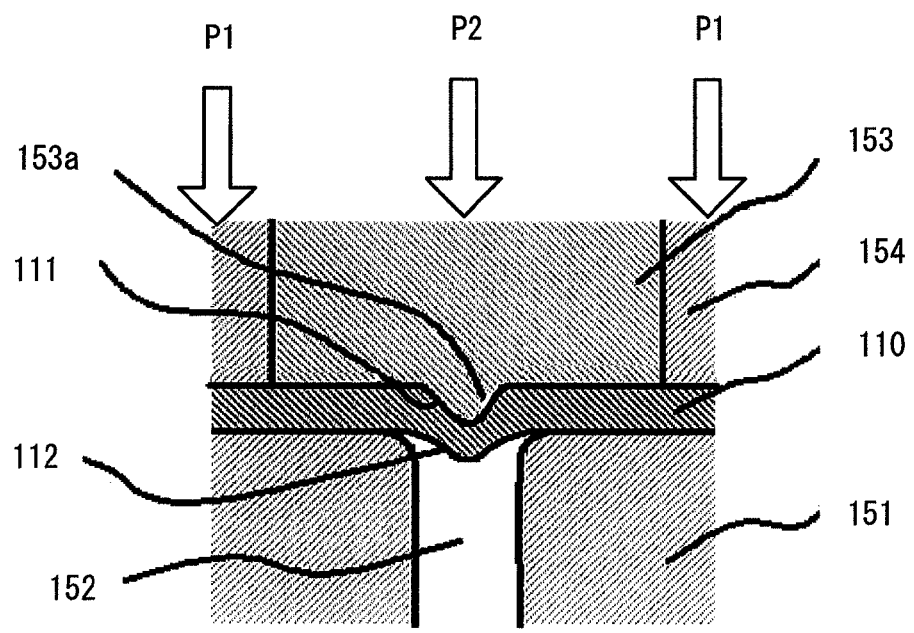

FIGS. 8A and 8B are sectional views for explanation of a method of forming the projecting portion 112 on the one metallic member 110.

As shown in FIG. 8A, a lower die 151 whose upper surface is formed with a void portion 152 is disposed below the one metallic member 110', that at this stage is in the form of a flat plate. Furthermore, a forming punch 153 having a projection 153a that corresponds to the projecting portion 112 to be formed is disposed above the one metallic member 110'. The portion of the one metallic member 110' around the forming punch 153 is pressed against the lower die 151 by a pressing die 154.

In this case, the pressing force P1 exerted upon the pressing die 154 is of an order that does not plastically deform the one metallic member 110'. In this state, as seen in FIG. 8B, the forming punch 153 is driven so as to exert a pressing force P2 upon the one metallic member 110'. The void portion 152 is formed upon the lower die 151 so as to correspond to the projection 153a of the forming punch 153. Due to this, the portion of the one metallic member 110' that corresponds to the projection 153a of the forming punch 153 upon which this pressing force P2 is exerted is projected downwards into the void portion 152 of the lower die 151, so that the projecting portion 112 is formed. At this time, the depressed portion 111 is formed on the upper surface of the one metallic member 110 so as to correspond to the projecting portion 112, and thereby the one metallic member 110 is formed.

It should be understood that, when a conical depressed portion 111 is to be formed on the one metallic member 110, the projection 153a of the forming punch 153 has also a conical shape. And, when a linear groove-shape is to be formed on the one metallic member, the projection 153a has a linear angle-shape. According to the shape of the projection 153a, the depressed portion 111 of various shape can be formed.

Figure 6:
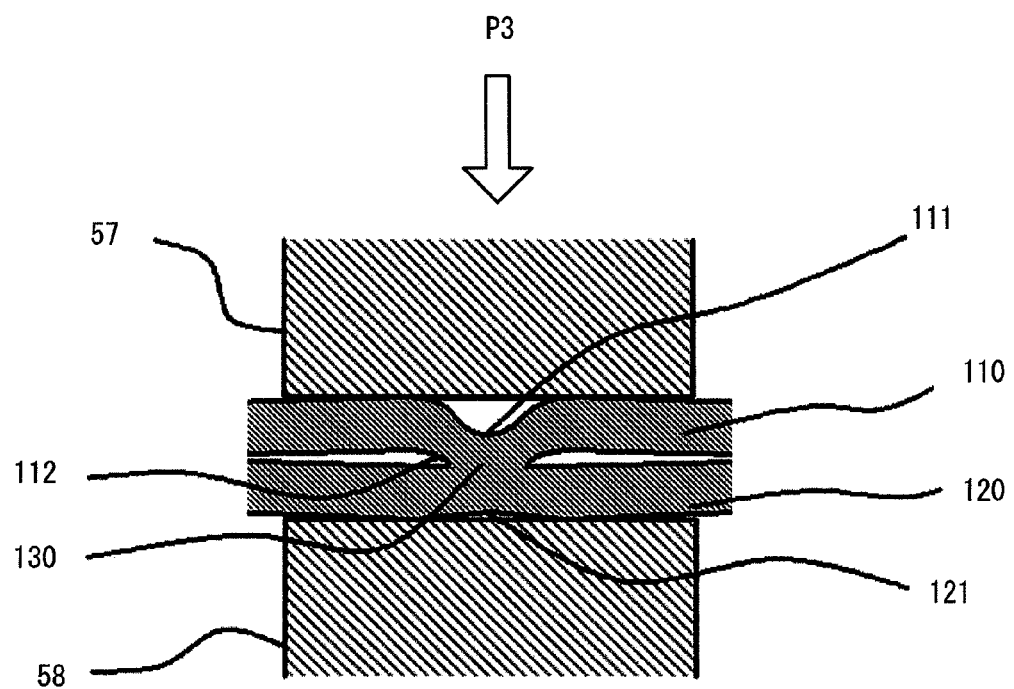
FIG. 6 is an enlarged sectional view continuing from FIG. 5, for explanation of a resistance welding process.

The one metallic member 110 and the other metallic member 120 that have been formed by the methods described above are arranged in the configuration shown in FIG. 5, and then resistance welding is performed as shown in FIG. 6.

It is to be noted that both the recessed portion (113 in FIG. 16) formed around the depressed portion 111 of the other metallic member 110 and the concave portion (121 in FIG. 6) have both shallow depth, thus both portions are referred as recessed portions.

Figure 9:
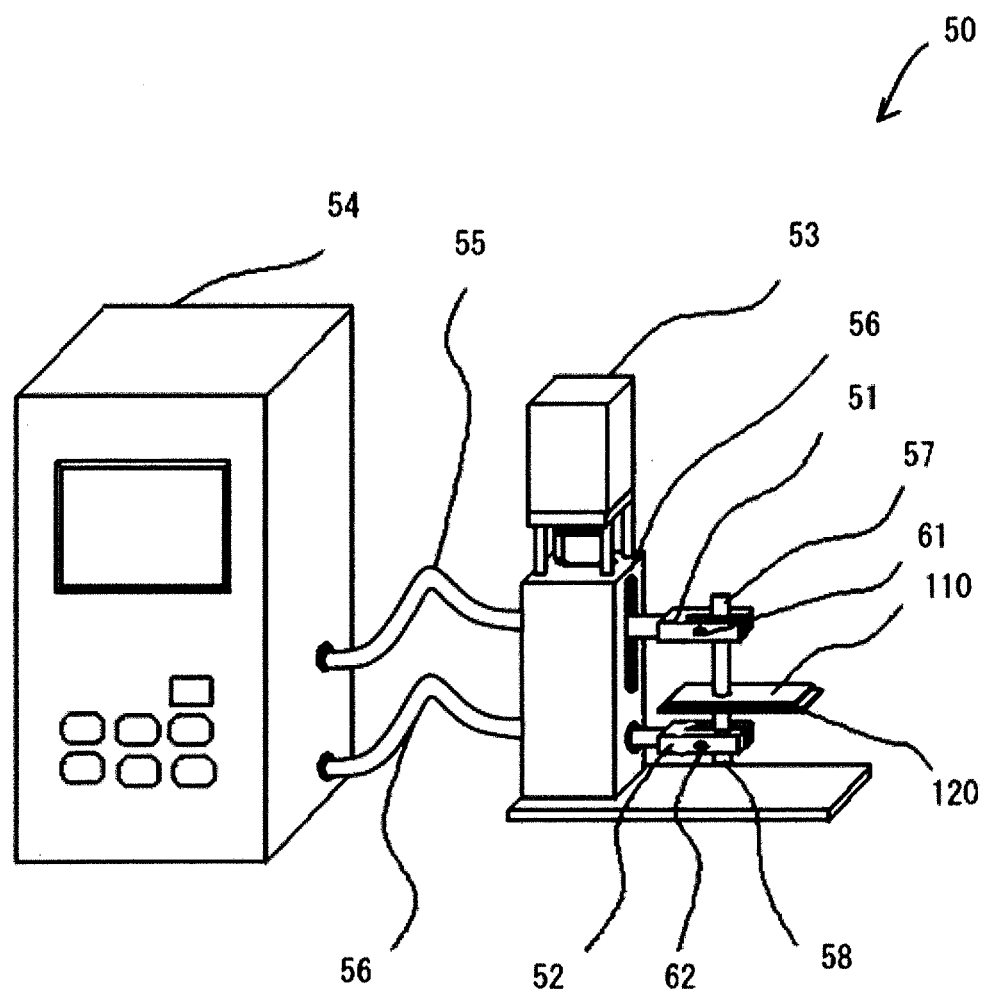
FIG. 9 is an external perspective view of a resistance welding machine.

FIG. 9 is an external perspective view of a resistance welding machine 50.

This resistance welding machine 50 includes a pair of upper and lower electrode holders 51 and 52, an air cylinder 53 that shifts the one 51 of these electrode holders upwards and downwards, a power supply for welding 54, and connecting conductors 55 and 56 that respectively connect the electrode holders 51 and 52 to the power supply for welding 54. A movable electrode 57 is held by the electrode holder 51 with a clamp bolt 61. And a fixed electrode 58 is held by the other electrode holder 52 with a clamp bolt 62. The other metallic member 120 is supported upon the upper surface of the fixed electrode 58, while the lower surface of the movable electrode 57 is contacted against the upper surface of the one metallic member 110 and applies pressure to it.

In other words, the one metallic member 110 and the other metallic member 120 are squeezed between the fixed electrode 58 and the movable electrode 57, and, as shown in FIG. 5, the other metallic member 120 is contacted against the projecting portion 112 of the one metallic member 110 and supports it. Then a pressing force is applied to the movable electrode 57 by the air cylinder 53, and at the time point that the pressing force reaches a set pressing force P3 (refer to FIG. 6) electrical current is supplied from the power supply for welding 54 via the connecting conductors 55 and 56. In other words, electrical current is supplied to the one metallic member 110 and the other metallic member 120. Due to this supply of electrical current, and due to the resistance values of the one metallic member 110 and the other metallic member 120 and the resistance of the contact region between them, Joule heat is generated corresponding to the value of the electrical current that is supplied, so that the one metallic member 110 and the other metallic member 120 become joined together by a solid-phase welding or a fusion welding. It should be understood that, in this state, the electrical current is concentrated at the contact portion between the one metallic member 110 and the other metallic member 120, so that welding is performed at this portion.

Since the predetermined pressing force P3 is applied to the movable electrode 57 from the air cylinder 53, and since during the joining process the one metallic member 110 and the other metallic member 120 contact one another via the projecting portion 112, accordingly the region of the other metallic member 120 peripheral to and centered around the projecting portion 112 undergoes bending towards the one metallic member 110.

However, in this embodiment, the concaved portion 121 is formed in advance on the outer surface of the other metallic member 120 in its region that corresponds to the welded portion 130. Due to this, the other metallic member 120 contacts the upper surface of the fixed electrode 58 over a wide area around the region peripheral to the concaved portion 121, and thus the concentration of stress is mitigated. Because of this, the bending of the region on the other metallic member 120 around the projecting portion 112 towards the one metallic member 110 becomes small. Accordingly, as shown in FIG. 6, even during the welding process, the other metallic member 120 contacts against the upper surface of the fixed electrode 58 over a wide area around the region peripheral to the concaved portion 121.

Figure 10:
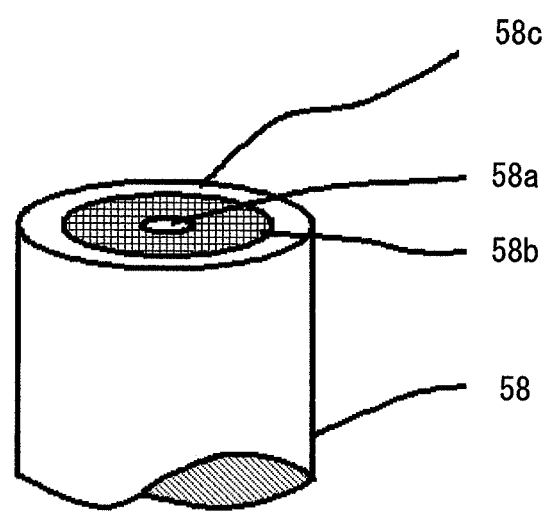
FIG. 10 is an external perspective view for explanation of a contact region between a welding electrode and one of the metallic members.
Figure 13:
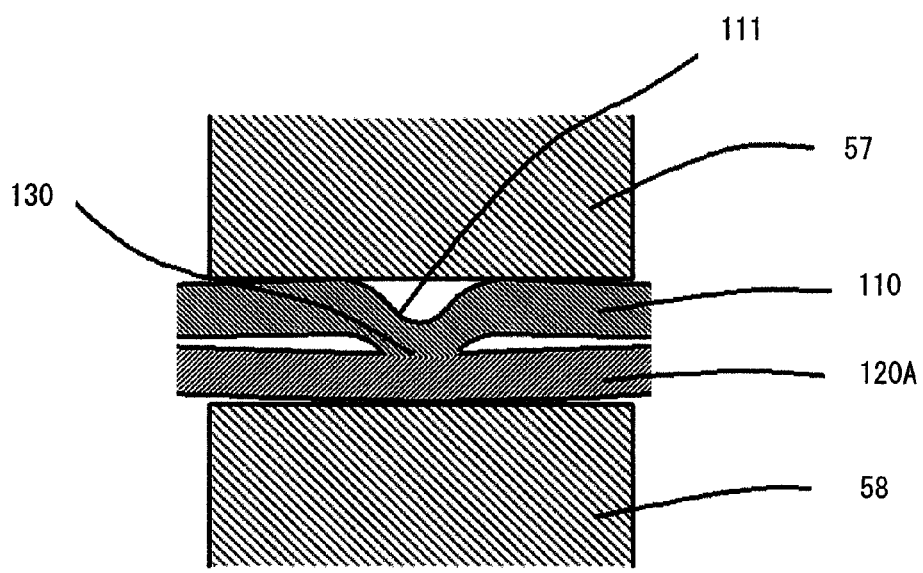
FIG. 13 is an enlarged sectional view for explanation of a welding process according to this comparison example, following on from FIG. 12.

FIG. 10 is a perspective view showing the region on the upper surface of the fixed electrode 58 where it contacts against the other metallic member 120. 58a in the figure is a non-contacting region that corresponds to the concaved portion 121 on the other metallic member 120. Moreover, 58b is a region of contact with the other metallic member 120, while 58c is a region that is not in contact therewith due to the other metallic member 120 being deformed. As described above, by the concaved portion 121 being formed in advance upon the other metallic member 120 (refer to FIG. 5), the contact region 58b becomes shaped as a ring that is quite wide in the radial direction, in other words, the area of this contact region 58b is large as compared with a case (not according to the present invention) in which no such concaved portion 121 is formed, as illustrated in FIG. 13. Due to this, it is possible to reduce the density of the electrical current at the contact portion between the other metallic member 120 and the fixed electrode 58, and, along with this current reduction, the Joule heating generated at the contact portion between the metallic member 120 and the fixed electrode is suppressed.

Figure 11:
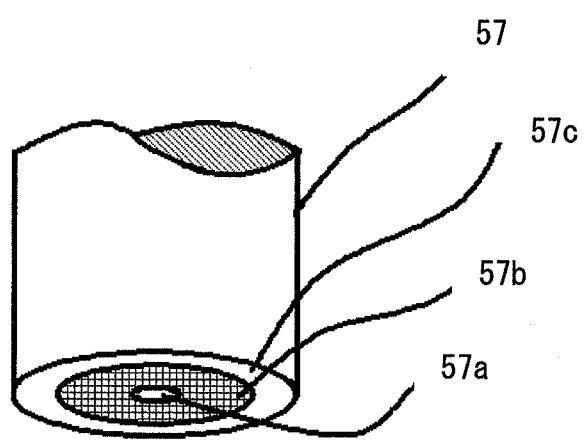
FIG. 11 is an external perspective view for explanation of a contact region between the other welding electrode and the other metallic member.

FIG. 11 is a perspective view showing the region on the lower surface of the movable electrode 57 where it contacts against the one metallic member 110. 57a in the figure is a non-contacting region that corresponds to the depressed portion 111 on the one metallic member 110. Moreover, 57b is a region of contact with the one metallic member 110, while 57c is a region that is not in contact therewith due to the one metallic member 110 being deformed. As described above, by the depressed portion 111 being formed in advance upon the one metallic member 110, the contact area between the one metallic member 110 and the movable electrode 57 is increased, so that the electrical current density at this portion during welding becomes lower, and accordingly the amount of generation of Joule heat becomes lower.

Thus, as shown in FIG. 11, during the welding process, the one metallic member 110 also contacts against the lower surface of the movable electrode 57 over a wide area in the region peripheral to the depressed portion 111. Due to this, the density of the electrical current that flows during welding through the contact area between the one metallic member 110 and the movable electrode 57 can also be reduced, and along with this it is possible to suppress the generation of Joule heating. In other words, since the contact area between the metallic member 110 and the movable electrode 57 is increased, accordingly the electrical current density at the contact portion between the metallic member 110 and the movable electrode 57 during welding becomes lower, and therefore the amount of heat generated due to the contact resistance at this portion is kept down.

Figure 12:
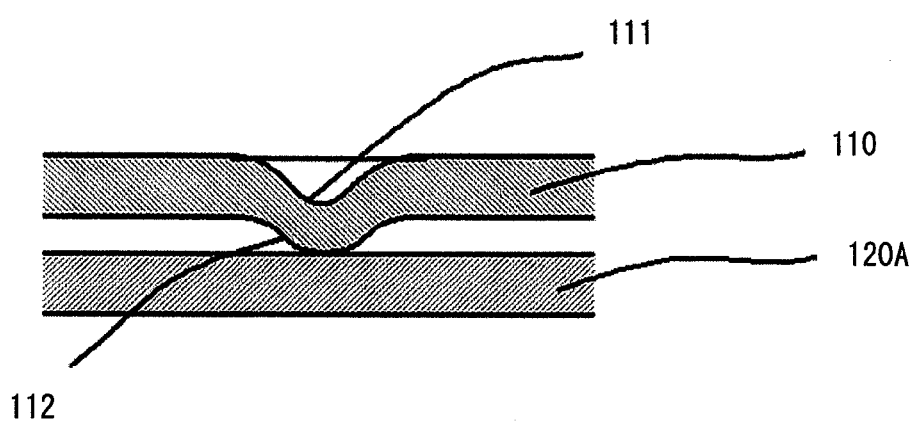
FIG. 12 is an enlarged sectional view showing the structure of metallic members before welding, in a comparison example.

FIGS. 12 and 13 are figures related to this comparison welding method that is cited herein by way of example for comparison with the first embodiment of the present invention as described above, and are respectively an enlarged sectional view showing the structure of metallic members before welding, and an enlarged sectional view for explanation of a process that follows on from the state shown in FIG. 12.

The one metallic member 110 shown in FIG. 12 has a projecting portion 112 and a depressed portion 111, and is the same as the one metallic member 110 that is shown in FIG. 5 in connection with the present invention. However, the other metallic member 120A in this comparison example is a simple flat plate shaped member that has no concaved portion 121, and thus is different from the other metallic member 120 that is shown in FIG. 5 in connection with the present invention.

Since, as described above, the predetermined pressing force P3 is applied from the air cylinder 53 to the movable electrode 57, accordingly stress is concentrated upon the projecting portion 112 during the joining process, due to the one metallic member 110 and the other metallic member 120A being pressed together in mutual contact. Because of this, as shown in FIG. 13, a large degree of bending takes place in the other metallic member 120A in the direction to displace the region around the projecting portion 112 as a center upwards towards the one metallic member 110.

Figure 14:
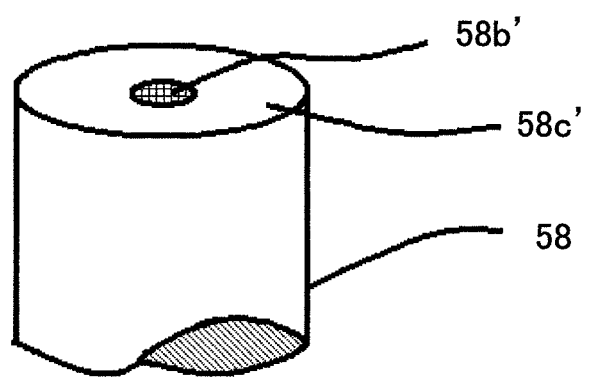
FIG. 14 is an external perspective view for explanation of a contact region between a welding electrode and one of the metallic members, in the comparison example.

FIG. 14 is a perspective view showing the contact region 58b' between the lower surface of the other metallic member 120A and the upper surface of the fixed electrode 58. Since no concaved portion 121 is formed before welding on the other metallic member 120A, accordingly there is no corresponding non contacting region in the center. Due to this, bending takes place in the other metallic member 120A with a large amount of deformation, and thus the contact region 58b' between the other metallic member 120A and the fixed electrode 58 becomes a circle that is small in area, while the non-contacting region 58c' around this contact region 58b' becomes large in area. Accordingly, the density of electrical current during welding at this contact portion between the other metallic member 120A and the fixed electrode 58 becomes high, and a large amount of Joule heat is generated.

Figure 15:
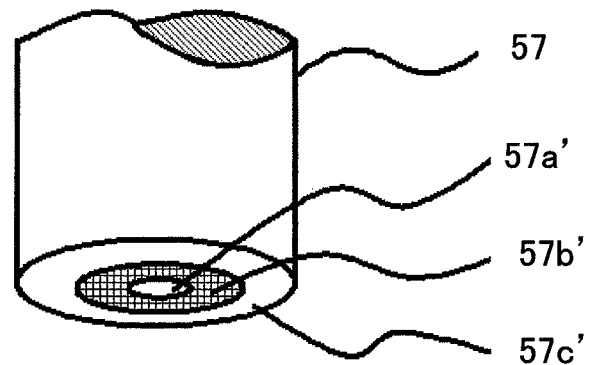
FIG. 15 is an external perspective view for explanation of a contact region between the other welding electrode and the other metallic member, in the comparison example.

And FIG. 15 is a perspective view showing the contact region between the upper surface of the one metallic member 110 and the lower surface of the movable electrode 57. 57a' in the figure is a non contacting region that corresponds to the depressed portion 111 of the one metallic member 110. Moreover, 57b' is the contact region with the one metallic member 110, while 57c' shows that the contacting region becomes small due to deformation of the one metallic member 110 caused by heat generated in the other metallic member 120A. The density of electrical current during welding at this contact portion between the one metallic member 110 and the movable electrode 57 becomes higher, and of the generated Joule heat becomes larger. Due to this, a large bending of the one metallic member 110 towards the other metallic member 120A takes place, and during welding on the fixed electrode 58, the contact region 57b' with the one metallic member becomes smaller than the present embodiment shown in FIG. 10.

Accordingly, in this comparison example, with the welded construction and the welding method by resistance welding shown in FIGS. 14 and 15, due to the fact that during welding large amounts of heat are generated at the contact portions between the metallic member 120A and the fixed electrode 58, it may become impossible to ensure an adequate connection strength due to damage caused to the welded portion, and moreover damage to the welding electrode may occur due to melted portions of the metallic member adhering to the welding electrode.

By contrast, according to the welded construction and the welding method by resistance welding of this embodiment of the present invention as explained with reference to FIGS. 6 through 11, during welding, the density of electrical current at the contact portion between the movable electrode 57 and the one metallic member 110 on the one hand, and the density of electrical current at the contact portion between the fixed electrode 58 and the other metallic member 120 on the other hand, are both low, and accordingly it is possible to suppress concentration of heat generation at these portions. Due to this, damage to the welded portion due to generation of heat at the contact portions between the welding electrodes and the metallic members does not take place, and also adhesion of molten portions of the metallic members to the welding electrodes does not occur; so that it is possible to obtain a joining construction whose reliability is good, and moreover with which the production efficiency is high.

It should be understood that the welded construction and the welding method by resistance welding according to the present invention may be realized by various other embodiments, as well as by the embodiment described above. In the following, various other embodiments will be described.

Embodiment #2

Figure 16:
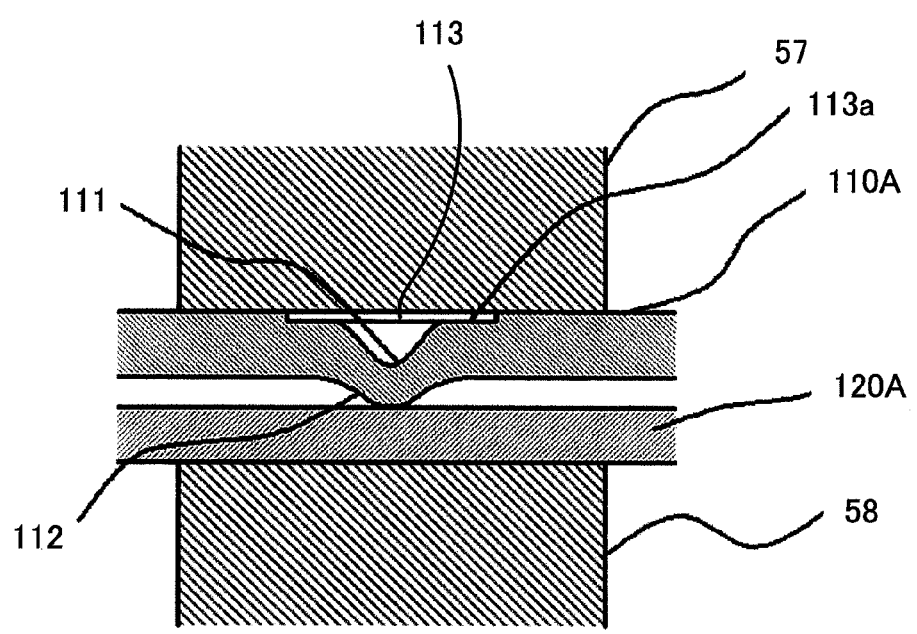
FIG. 16 is an enlarged sectional view showing a second embodiment of the present invention.

FIG. 16 shows a second embodiment of the present invention. This figure is an enlarged sectional view for explanation of this construction to be welded, directly before flowing of the electrical current for welding. A depressed portion 111 is formed at the upper portion of the one metallic member 110A shown in FIG. 16, and a recessed portion 113 having a greater width (i.e. diameter) than this depressed portion 111 is formed over the depressed portion 111. Moreover, the other metallic member 120A is a plate shaped member that is all of uniform thickness, and no recessed portion is formed thereupon.

The bottom surface 113a of the recessed portion 113 formed in the one metallic member 110A does not contact against the lower surface of the movable electrode 57, even during the welding process. Moreover, since the stress concentration acting on the projecting portion 112 of the one metallic member 110A is dispersed, deformation due to bending of the metallic member 110A is reduced. Thus, compared with the case of the first embodiment, it is possible to prevent an increase of electrical current density, similar to the effect as in the first embodiment.

Figure 17A:
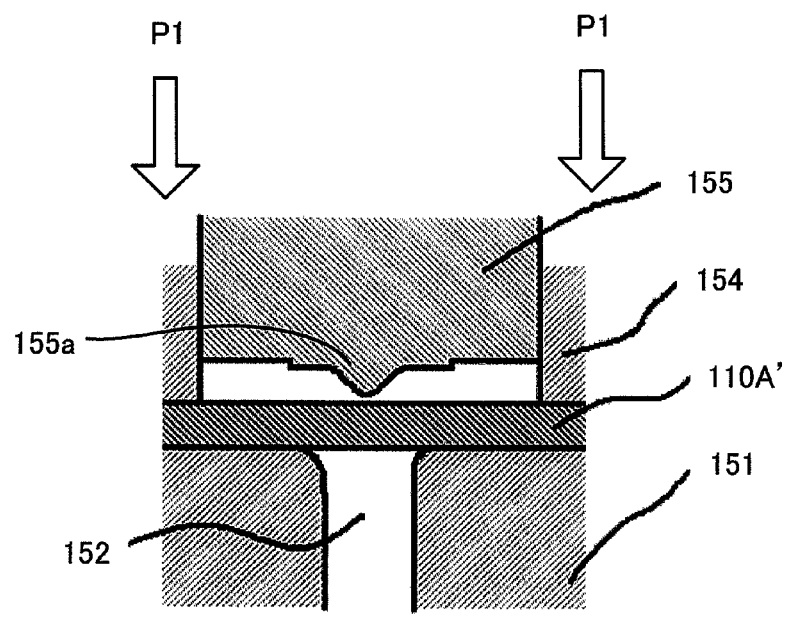
FIGS. 17A and 17B are enlarged sectional views for explanation of a method for forming a metallic member shown in FIG. 16.
Figure 17B:
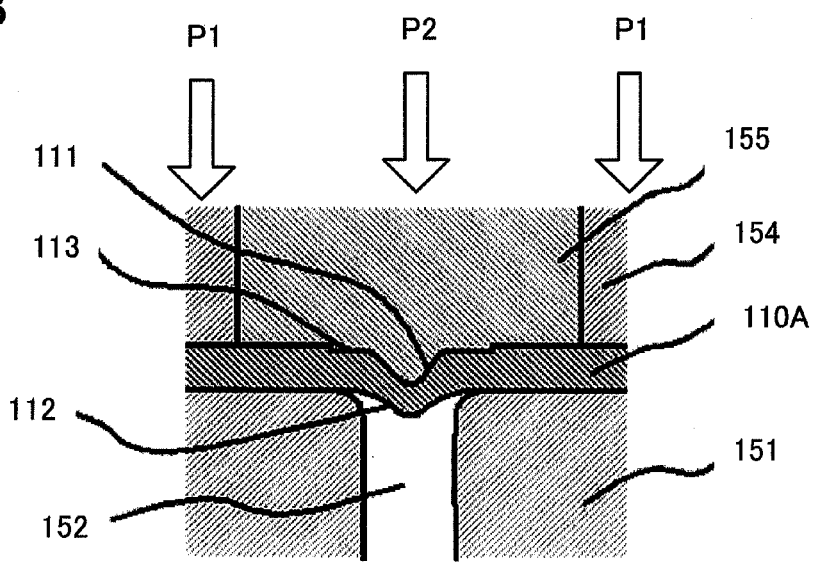

FIGS. 17A and 17B are sectional views for explanation of a method of forming the one metallic member 110A.

As shown in FIG. 17A, a lower die 151 that is formed with a void portion 152 is disposed underneath the lower surface of the one metallic member 110A', this being initially shaped as a flat plate. Moreover, a forming punch 155 that has a projecting 155a having a shape corresponding to the desired final shape for the depressed portion 111 and the recessed portion 113 is disposed above the upper surface of the one metallic member 110A'. The portion of the one metallic member 110A' at the periphery of the forming punch 155 is pressed against the lower die 151 by a pressing die 154.

In this case, the pressing force P1 that is applied to the pressing die 154 is of an order that does not cause plastic deformation of the one metallic member 110A'. In this state, as shown in FIG. 17B, the forming punch 155 is driven, and a pressing force P2 is applied to the one metallic member 110A'. The void portion 152 that is formed in the lower die 151 corresponds to the projection 155a of the forming punch 155. Due to this, the portion of the one metallic member 110A' that is pushed downwards by the projection 155a of the one forming punch 155 is driven to project into the void portion 152 of the lower die 151, and thereby the projecting portion 112 is formed. At this time, the depressed portion 111 and the recessed portion 113 are formed on the upper surface of the one metallic member 110 so as to correspond to the projecting portion 112, and thereby the one metallic member 110A is formed.

As explained above, for the one metallic member 110A in this second embodiment, it is possible to further reduce the amount of jule-heating on the contact portion with the movable electrode 57 than in the case of the first embodiment. Moreover since, in this second embodiment, it is possible to manage with only one episode of press processing (even though, when forming the one metallic member 110A, the shape is different from that in the first embodiment), accordingly it is possible to enhance the productivity as compared with the case of the first embodiment.

Embodiment #3

Figure 18:
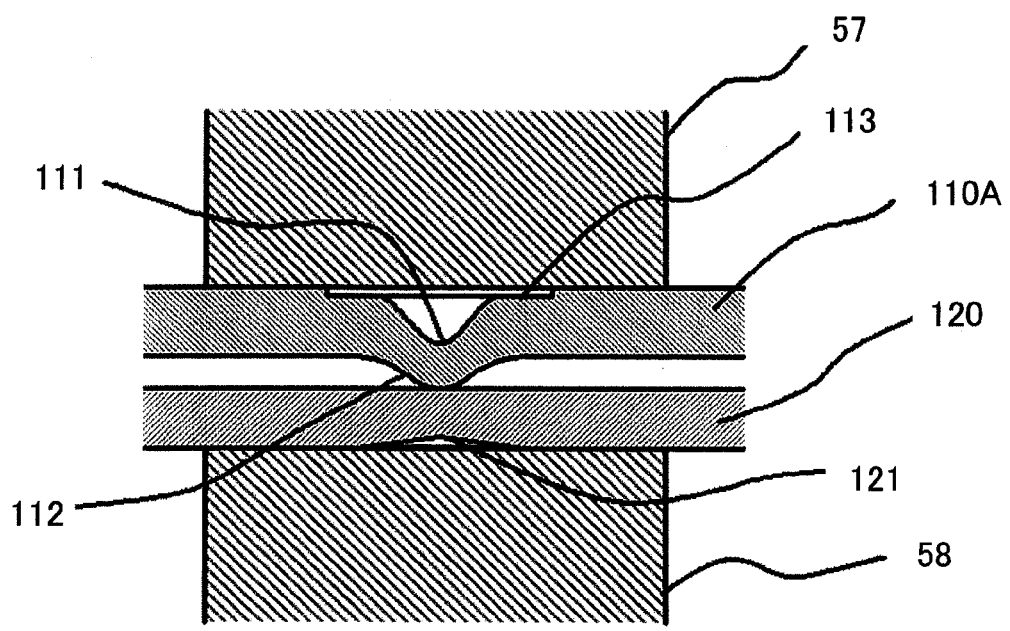
FIG. 18 is an enlarged sectional view showing a third embodiment of the present invention.

FIG. 18 shows a third embodiment of the present invention. This figure is an enlarged sectional view for explanation of the construction to be welded, directly before flowing of the electrical current for welding. The feature by which this third embodiment shown in FIG. 18 differs from the second embodiment shown in FIG. 16 is that the other metallic member 120 has a concaved portion 121, just like the first embodiment shown in FIG. 5. In other words, in this third embodiment, a recessed portion 113 that does not contact the movable electrode 57 is formed upon the one metallic member 110A, while also the concaved portion 121 that does not contact the fixed electrode 58 is formed upon the other metallic member 120. Since, due to this, the contact area between the fixed electrode 58 and the metallic member 120 is increased, the deformation amounts of the one metallic member and the other metallic member, and the electrical current density is reduced, thus it is possible to reduce generation of heat in this portion during the welding process.

Accordingly, with this third embodiment as well, it is possible to obtain further better beneficial effects on heat generation reduction at the contact portions with electrodes than in the case of the first embodiment.

Embodiment #4

Figure 19:
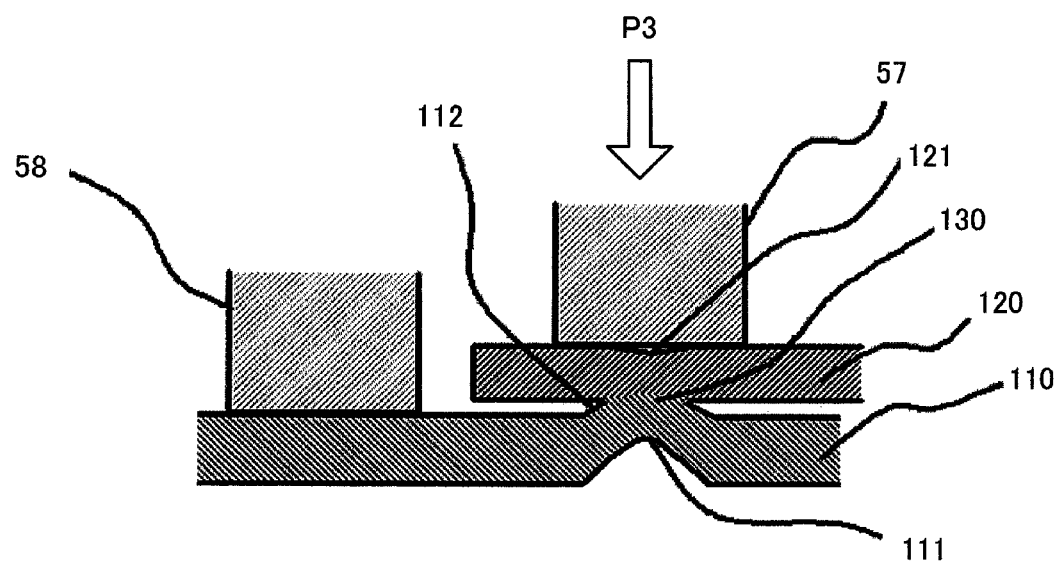
FIG. 19 is an enlarged sectional view showing a fourth embodiment of the present invention.

FIG. 19 shows a fourth embodiment of the present invention. This figure is an enlarged sectional view of the welded construction according to the fourth embodiment in its state in which joining by resistance welding has been completed.

In this fourth embodiment, a method is adopted of performing welding in the state in which the movable electrode 57 and the fixed electrode 58 are arranged so that their axes are parallel, and so that they both point downwards and contact against upwardly facing contact surfaces of the metallic members to be welded. The one metallic member 110 has a projecting portion 112 and a depressed portion 111 that corresponds to the projecting portion 112, and is mounted upon a stand not shown in the figure with the surface on which the depressed portion 111 is formed facing downwards. And the other metallic member 120 is disposed at a position corresponding to the projecting portion 112, with its concaved portion 121 facing in the opposite direction to the projecting portion 112. The movable electrode 57 is disposed above the surface of the other metallic member 120 on which the concaved portion 121 is formed, concentrically to the concaved portion 121. Moreover, the fixed electrode 58 is disposed in an attitude with its axis parallel to the axis of the movable electrode 57, above the one metallic member 110 at a region thereof which is laterally displaced from the portion at which the projecting portion 112 of the one metallic member 110 is formed.

A pressing force P3 is applied to the movable electrode 57, and electrical current for welding is applied between the movable electrode 57 and the fixed electrode 58. And, since the concaved portion 121 to which the movable electrode 57 does not contact is formed in advance also on the other metallic member 120, accordingly it is possible to increase the contact area between the other metallic member 120 and the movable electrode 57, so that it is possible to suppress excessive generation of heat. Accordingly, with this fourth embodiment as well, it is possible to obtain the same beneficial effects as in the case of the first embodiment.

Embodiment #5

Figure 20:
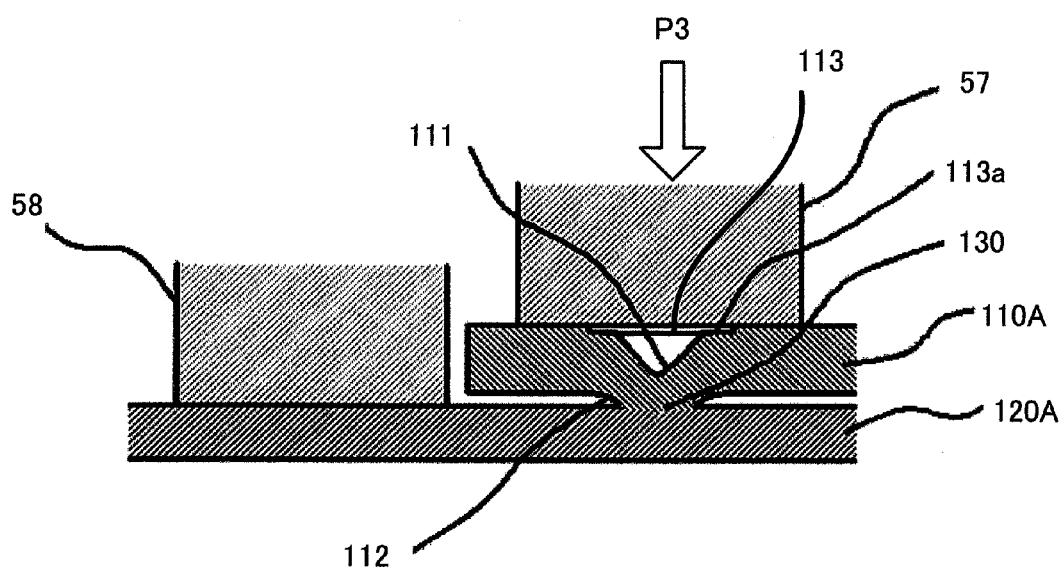
FIG. 20 is an enlarged sectional view showing a fifth embodiment of the present invention.

FIG. 20 shows a fifth embodiment of the present invention. This figure is an enlarged sectional view of the welded construction according to the fifth embodiment, in its state in which joining by resistance welding has been completed.

Just as for the fourth embodiment, this fifth embodiment shows a method in which welding is performed in the state in which the movable electrode 57 and the fixed electrode 58 are arranged so that their axes are parallel, and so that they both point downwards and contact against contact surfaces of the metallic members to be welded.

The feature by which this fifth embodiment differs from the fourth embodiment shown in FIG. 19 is that, in this fifth embodiment, a combination of the one metallic member 110A and the other metallic member 120A like that shown in FIG. 16 is employed.

In other words, the other metallic member 120A is not formed with any recessed portion, but is a simple plate shaped member having uniform thickness all over. The lower surface of this other metallic member 120 is mounted upon a stand not shown in the figure. Moreover, a depressed portion 111 is formed in the one metallic member 110A, and a recessed portion 113 having width (diameter) larger than the depressed portion 111 is formed above the depressed portion 111. The one metallic member 110A is disposed above the upper surface of the other metallic member 120A, with its projecting portion 112 facing downwards.

The movable electrode 57 is disposed above the upper surface of the one metallic member 110A on which the recessed portion 113 is formed, concentrically with the recessed portion 113. Moreover, the fixed electrode 58 is disposed in an attitude with its axis parallel to the axis of the movable electrode 57, above the other metallic member 120A at a region thereof which is laterally displaced from the region which corresponds to the projecting portion 112 of the one metallic member 110.

A pressing force P3 is applied to the movable electrode 57, and electrical current for welding is applied between the movable electrode 57 and the fixed electrode 58. As explained in connection with the second embodiment, the bottom surface 113a of the recessed portion 113 formed in the one metallic member 110A does not contact the lower surface of the movable electrode 57, even during the welding process. With this construction, since the contact area between the movable electrode 57 and the metallic member 110A is further increased as explained in FIG. 18, and since the deformation amount of the one metallic member is reduced, the density of electrical current is reduced, accordingly it is possible to suppress generation of heat at this contact portion. Accordingly, with this fifth embodiment as well, it is possible to obtain the same beneficial effects as in the case of the second embodiment.

Embodiments #6 through #11

FIGS. 21A and 21B through FIGS. 26A and 26B are, respectively, sectional views and external perspective views showing metallic members according to other embodiments.

Since each of these members may be either the one metallic member or the other metallic member of the embodiments in question, here they will simply be generically termed "metallic members".

Embodiment #6

Figure 21A:
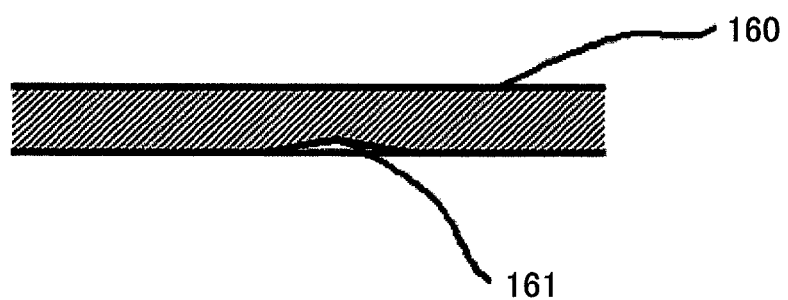
FIGS. 21A and 21B show a sixth embodiment of the present invention.
Figure 21B:
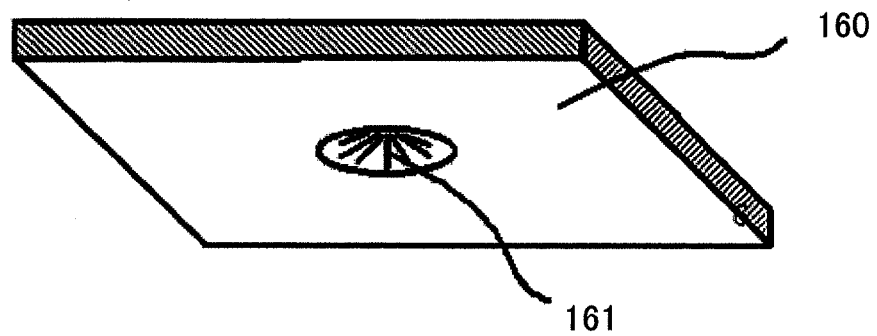

The metallic member 160 of the sixth embodiment of the present invention shown in FIGS. 21A and 21B has a cone shaped concave portion 161.

Embodiment #7

Figure 22A:
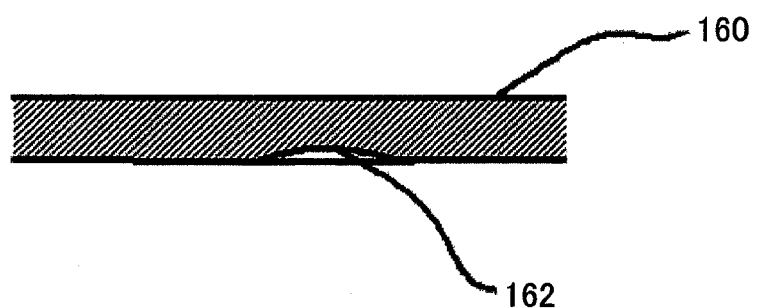
FIGS. 22A and 22B show a seventh embodiment of the present invention.
Figure 22B:
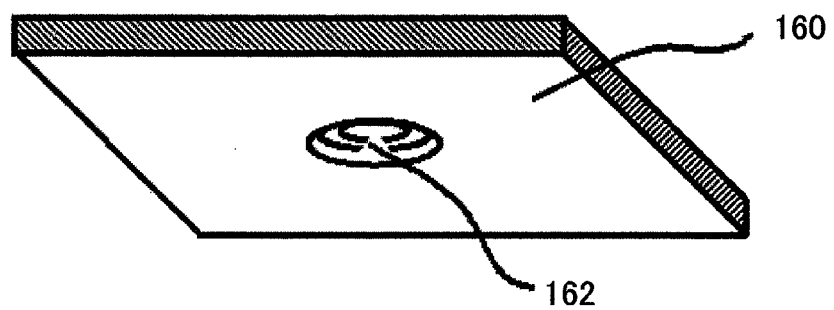

The metallic member 160 of the seventh embodiment of the present invention shown in FIGS. 22A and 22B has a hemispherical or dome shaped concave portion 162.

Embodiment #8

Figure 23A:
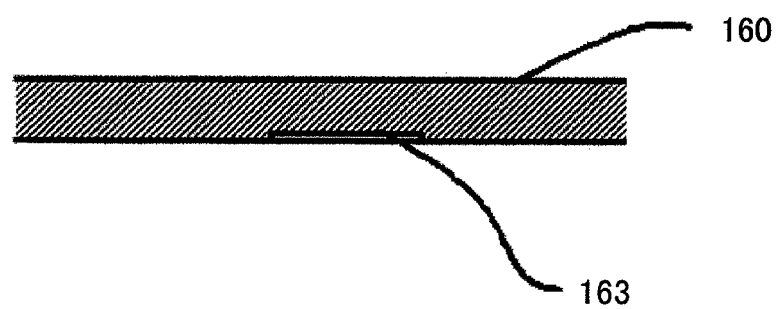
FIGS. 23A and 23B show an eighth embodiment of the present invention.
Figure 23B:
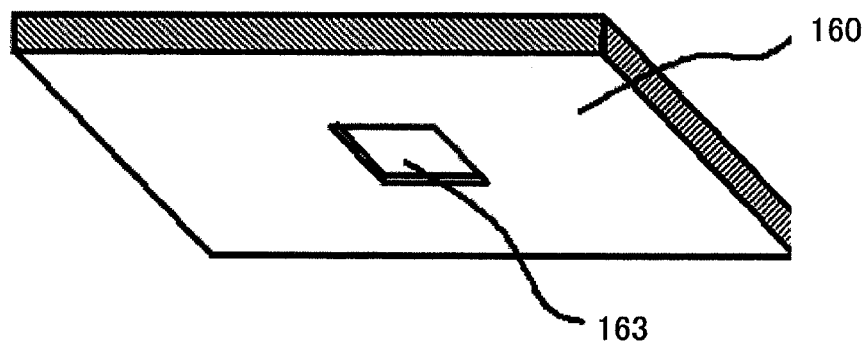

The metallic member 160 of the eighth embodiment of the present invention shown in FIGS. 23A and 23B has a rectangular shaped recessed portion 163. The depth of the bottom surface of this recessed portion 163 is substantially uniform measured from its surrounding area. Further in this case, this recessed portion 163 may be of a long rectangular shape, i.e. of a groove-like shape with a certain width.

Figure 24A:
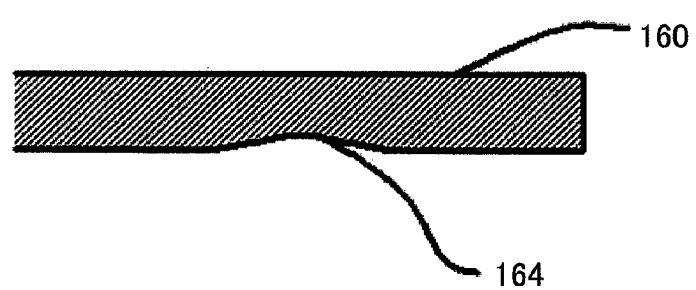
FIGS. 24A and 24B show a ninth embodiment of the present invention.
Figure 24B:
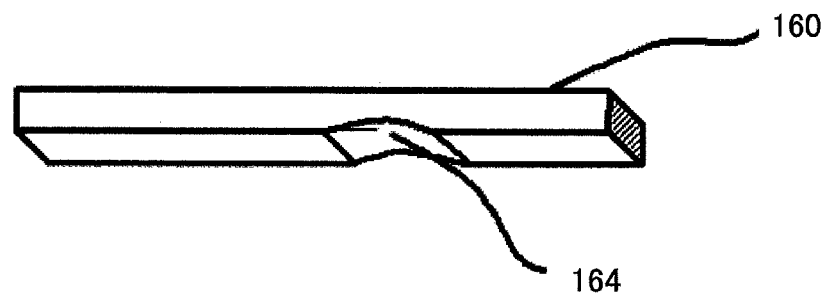
Figure 25A:
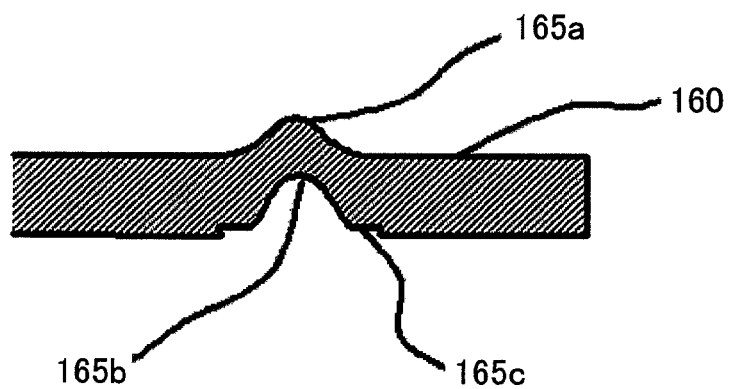
FIGS. 25A and 25B show a tenth embodiment of the present invention.
Figure 25B:
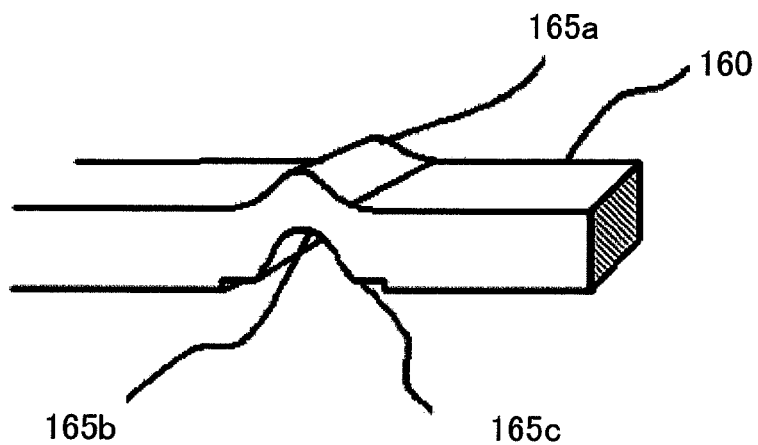

It should be understood that, when the metallic member 160 is shaped externally as a band or a strip as shown in the FIGS. 24B and 25B, the recessed portion 163 may be formed as a groove across the whole width thereof.

Embodiment #9

The metallic member 160 of the ninth embodiment of the present invention shown in FIGS. 24A and 24B is shaped externally as a band or a strip, and its concave portion 164 is formed in a shallow groove-shape whose cross section is a circular arc.

It should be understood that the metallic member 160 may have a shape other than a band or a strip, though in FIG. 24B it is shown that the concave portion 164 with a shallow groove-shape is formed across the whole width of the metallic member 160. When a metallic member other than a band or a strip is employed, for example in a case of a rectangular or a circular metallic plate member, it is acceptable that the concave portion 164 with a shallow groove-shape is formed at a portion of the surface area of the metallic plate member.

Embodiment #10

The metallic member 160 of the tenth embodiment of the present invention shown in FIGS. 25A and 25B is shaped externally as a band or a strip.

This metallic member 160 has a projection 165a that projects and extends all the way across one surface thereof in the width direction and that is angle-shaped like a hill in cross section, and moreover, on its other surface, has a depressed portion 165b corresponding to this projection 165a, also shaped like a inwardly facing angle-shaped in cross section and extending all the way across this surface in the width direction, with a recessed portion 165c, rectangular in cross section, being formed over this depressed portion 165b. This shape of the projection 165a or the depressed portion 165b can be formed as explained referring to FIGS. 17A and 17B.

The metallic member 160 may have a shape other than a band or a strip, though in FIG. 25B it is shown that the depressed portion 165b with an angle-shape in cross section and a recessed portion 165c around the depressed portion 165b are formed across the whole width of the metallic member 160. When a metallic member other than a band or a strip is employed, for example in a case of a rectangular or a circular metallic plate member, it is acceptable that the depressed portion 165b with an angle-shape in cross section and a recessed portion 165c around the depressed portion 165b are formed in a predetermined length at a portion of the surface area of the metallic plate member.

It should be understood that, when the above explained depressed portion 111 on the one metallic member 110 is formed with an angle-shape in cross section in a predetermined length as the depressed portion 165b, the concave portion 121 on the other metallic member should be formed with a shallow groove-shape along a corresponding length.

Embodiment #11

Figure 26A:
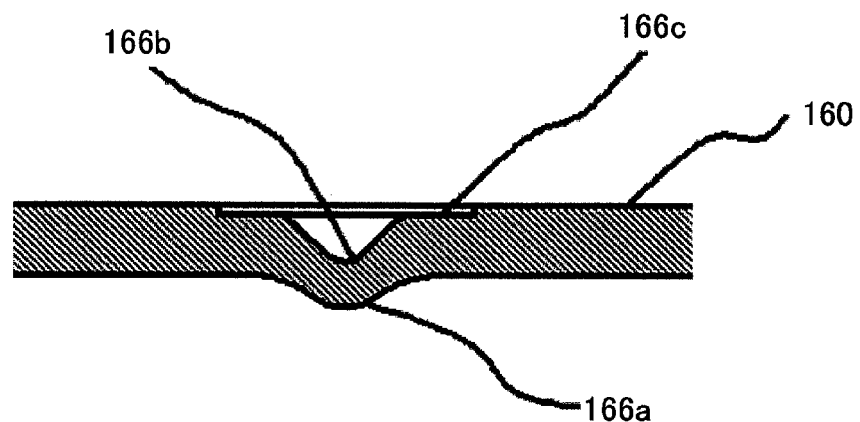
FIGS. 26A and 26B show an eleventh embodiment of the present invention.
Figure 26B:
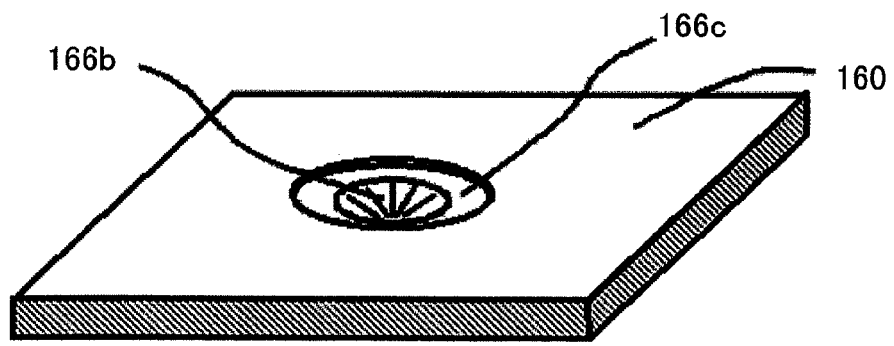

In the metallic member 160 of the eleventh embodiment of the present invention shown in FIGS. 26A and 26B, a projection 166a is formed on one side as a conical shape, a depressed portion 166b is formed on the other side in a hollow cone shape corresponding to the projection 166a, and a circular recessed portion 166c is formed above this depressed portion 166b. It should be understood that the recessed portion 166c portion may also have a rectangular shape instead of a circular one.

All of the metallic members 160 shown in the sixth through the eleventh embodiments described above have a depressed portion or a concave portion and/or a recessed portion that do not contact the movable electrode 57 or the fixed electrode 58. Due to this, when resistance welding is performed by supplying electrical current for welding in the state in which pressing force P3 is being applied, the density of the electrical current passing through the contact portions between the metallic members 160 and the movable electrode 57 or the fixed electrode is kept low, so that it is possible to keep down the amount of heat generation in the contact portions, and thereby it is possible to prevent damage to the welding electrodes and to prevent the welding electrodes from adhesion of the metallic members.

It should be understood that the present invention can also be applied to other devices than the secondary cell to which it was shown as being applied in the first embodiment; in the following, examples in which the present invention is applied to other devices will be explained.

Embodiment #12

Figure 27:
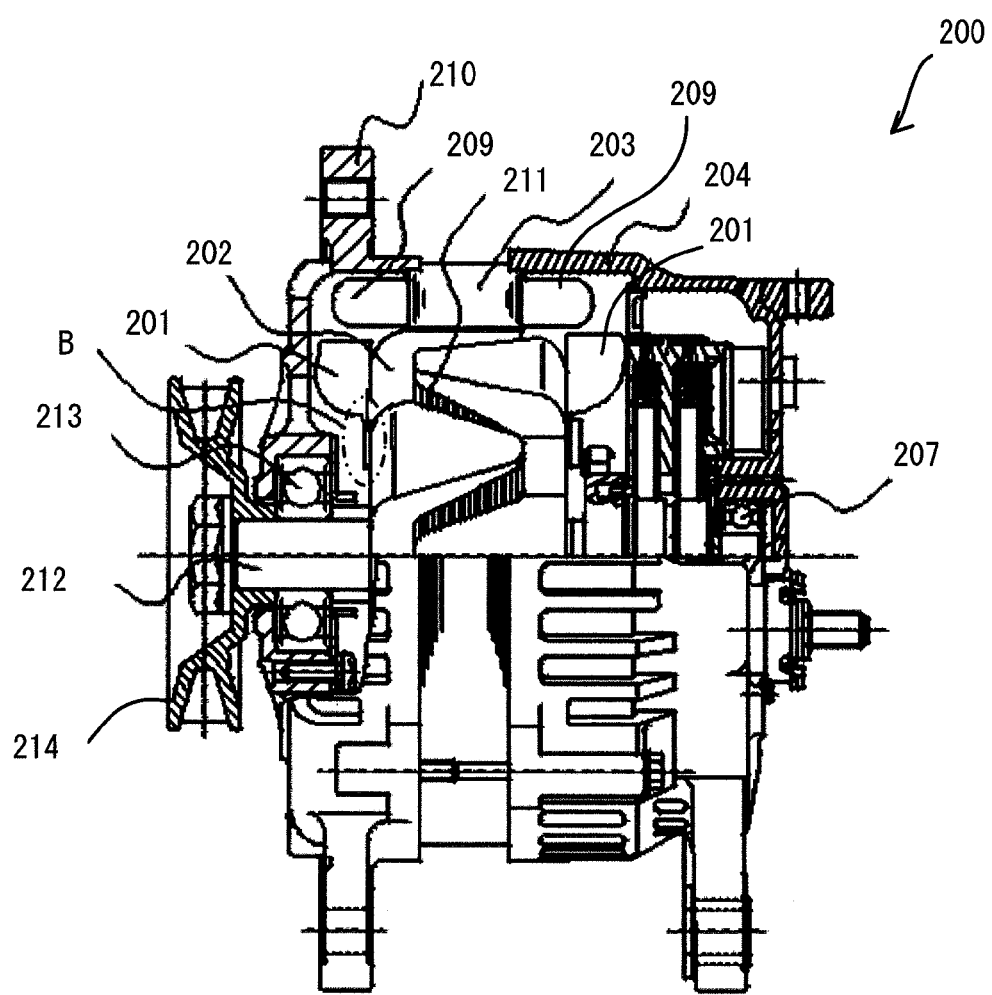
FIG. 27 shows a twelfth embodiment of the present invention, and is a partly cut away side view of an AC generator for a vehicle.

FIG. 27 is a partially cut away side view of an exemplary AC generator 200 for a vehicle.

This AC generator for a vehicle includes two brackets: a front bracket 210 located on its side towards a pulley 214, and a rear bracket 204 located on its rear side opposite to the pulley 214. The front bracket 210 and the rear bracket 204 support a shaft 212 via a pulley side bearing 213 and a rear side bearing 207. The pulley 214 is fitted to one end of this shaft 212. The pulley 214 is connected to an engine output shaft via a belt, although this detail is not shown in the drawings.

A pole core 202 that includes a field magnet coil 211 is fitted on the shaft 212. A stator core 203 is arranged between the front bracket 210 and the rear bracket 204, and the pole core 202 is arranged so that a predetermined air gap distance is present between it and the stator core 203. The field magnet coil 211 is provided in the interior of the pole core 202, and a three phase stator coil 209 is wound upon the stator core 203. Two cooling fans 201 are provided on both outer end surfaces of the pole core 202, for cooling heat generated by the stator coil 209.

With this AC generator 200 for a vehicle, when the pulley 214 is rotated by being driven by the engine, the shaft 212 rotates. Along with the rotation of the shaft 212, the pole core 202 that is fitted upon this shaft 212 also rotates. And, due to the magnetic field of the field magnet coil 211 that is provided within the pole core 202, each of the poles of the pole core 202 alternatingly becomes a north magnetic pole and a south magnetic pole, and the magnetic flux between these poles of the pole core 202 passes from the north magnetic pole of the pole core 202 through the stator core 203 and returns to the south magnetic pole of the pole core 202, thus creating a magnetic circuit. Due to the magnetic flux of this moving magnetic circuit interlinking the stator coil 209, three phases of induced voltage are generated in the stator coils and are outputted.

In the AC generator for a vehicle shown in FIG. 27, the cooling fans 201 are welded to the pole core 202 by resistance welding.

Figure 28:
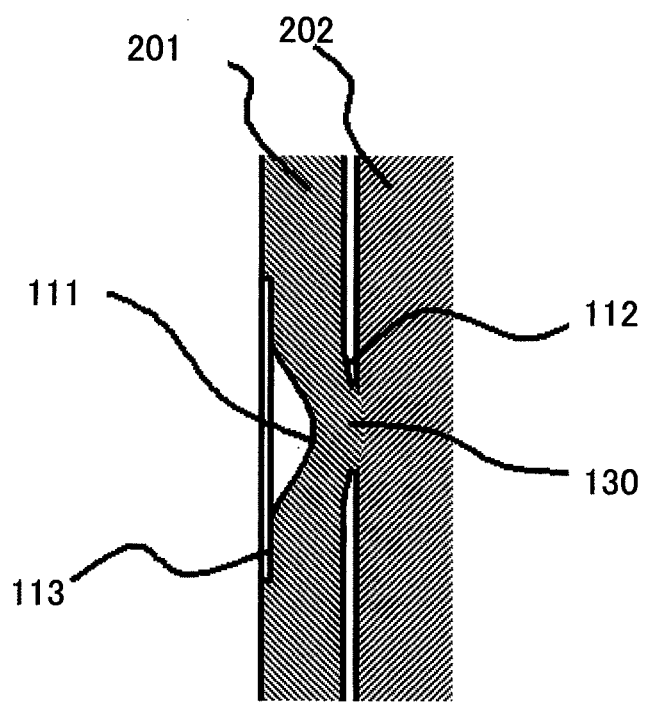
FIG. 28 is an enlarged sectional view of a portion B of FIG. 27.

FIG. 28 is an enlarged sectional view of a portion B of FIG. 27. The cooling fan 201 is constructed with plate shaped members made from, for example, nonmagnetic steel, and a projecting portion 112 is formed on its one side, while a depressed portion 111 having a shape corresponding to the projecting portion 112 and a recessed portion 113 located above this depressed portion 111 are formed on its other side. The width (i.e. diameter) of the recessed portion 113 is made to be greater than the width (diameter) of the depressed portion 111. The pole core 202 is, for example, made from magnetic steel, and one side of it is a flat surface. The projecting portion 112 of the centrifugal fan for cooling 201 is welded by resistance welding to this flat surface side of the pole core 202.

This type of welded construction may be obtained by employing the welding method of the second embodiment, as shown in FIG. 16. The welded construction shown in FIG. 28 is only one example; it would also be possible to employ a welded construction according to any one of the first through the eleventh embodiments described above.

Embodiment #13

Figure 29:
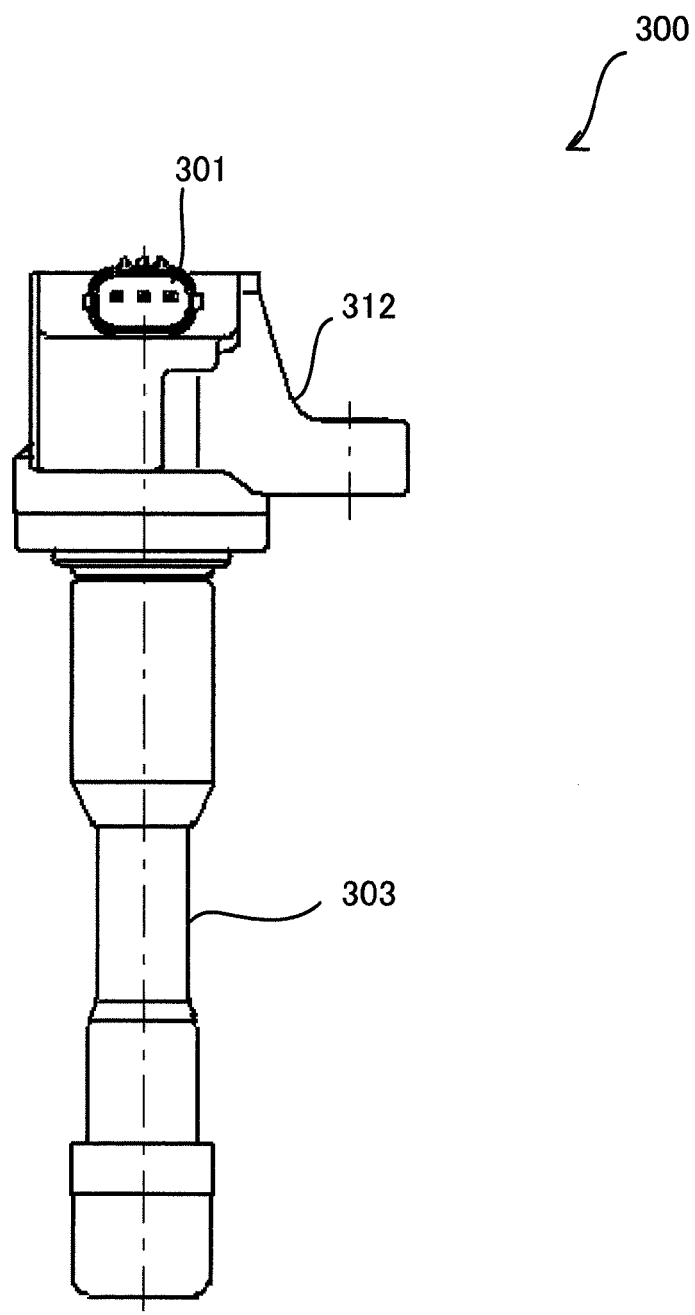
FIG. 29 is a side view of an ignition device for an internal combustion engine, showing a thirteenth embodiment of the present invention.
Figure 30:
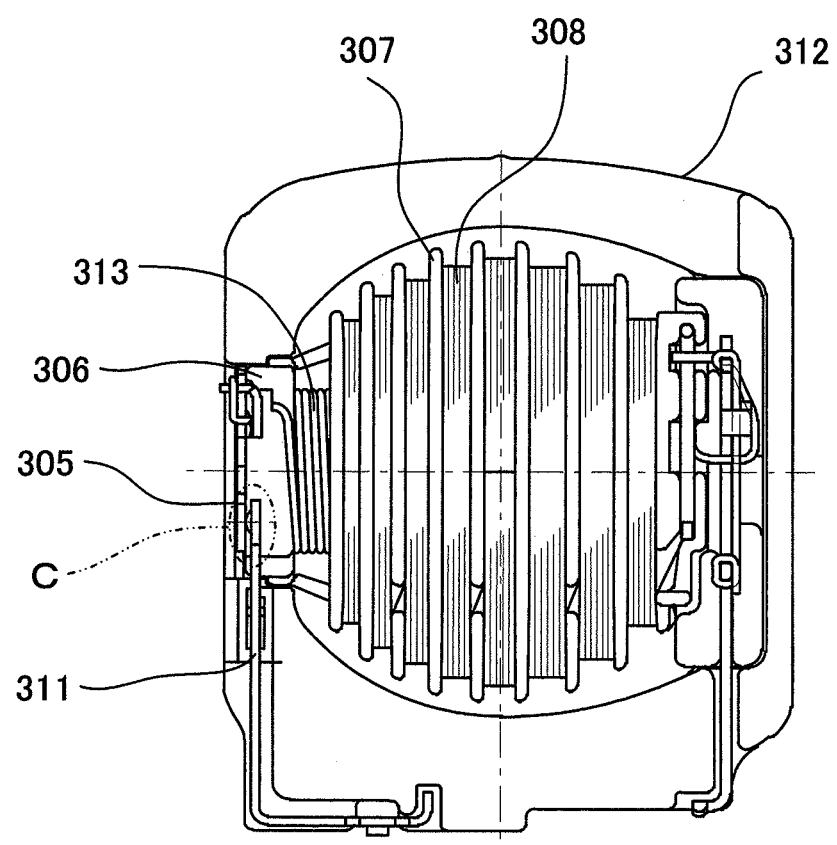
FIG. 30 is a plan view of a coil casing shown in FIG. 29.

FIG. 29 is a side view showing an overall view of an ignition device for an internal combustion engine, and FIG. 30 is a plan view of a coil casing shown in FIG. 29.

This ignition device 300 for an internal combustion engine includes an insulating coil casing 312, an adapter portion 330 for connection to a spark plug not shown in the figures, and a connector terminal 301 that supplies electrical power to a primary coil.

A primary bobbin 306 upon which a primary coil 313 is wound and a secondary bobbin 307 on which a secondary coil 308 is wound in multiple overlapping layers are disposed within the coil casing 312. The primary coil 313 and the secondary coil 308 that are wound on the primary bobbin 306 and the secondary bobbin 307 respectively are received within the coil casing 312 in a state of being covered with insulating resin. One end of the primary coil 313 is fixedly connected to the terminal plate 305, and is supplied with electrical power from the connector terminal 301. The intermediate terminal 311 is welded by resistance welding to this terminal plate 305.

Figure 31:
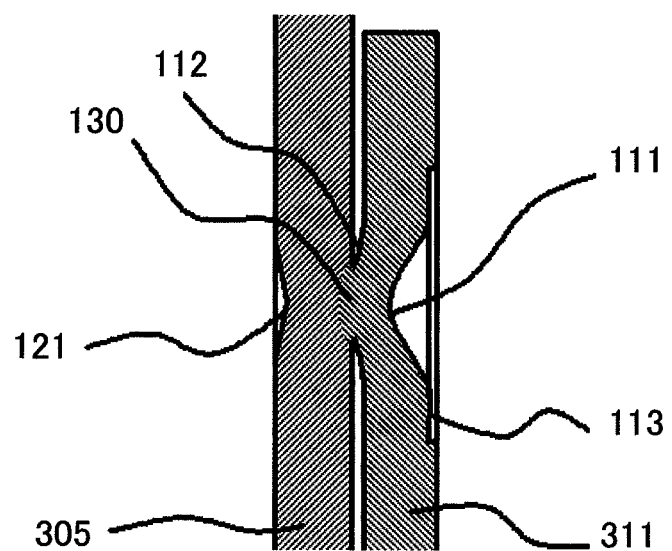
FIG. 31 is an enlarged sectional view of a portion C of FIG. 30.

FIG. 31 is an enlarged sectional view of a portion C of FIG. 30.

The intermediate terminal 311 is a plate shaped member made from, for example, brass, and a projecting portion 112 is formed on its one side, while a depressed portion 111 having a shape corresponding to the projecting portion 112 and a recessed portion 113 located above this depressed portion 111 are formed on its other side. The width (i.e. diameter) of the recessed portion 113 is made to be greater than the width (diameter) of the depressed portion 111. The terminal plate 305 is a plate shaped member made, for example, from brass, and a concaved portion 121 is formed on its side opposite to the projecting portion 112. The intermediate terminal 311 and the terminal plate 305 are welded together by resistance welding at a welded portion 130.

This type of welded construction may be obtained by employing the welding method of the third embodiment, as shown in FIG. 18. The welded construction shown in FIG. 31 is only one example; it would also be possible to employ a welded construction according to any one of the first through the eleventh embodiments described above.

As described above, with the welded construction and the welding method by resistance welding according to the present invention, since the depressed portion or a concave portion and/or a recessed portion are formed downwards from its peripheral region on the opposite side of the metallic member from its side that becomes the welded portion, in other words on its side against which the welding electrode contacts, accordingly the contact area of this metallic member with the welding electrode is increased. Due to this, it is possible to reduce the density of the electrical current flowing through the contact portion between the welding electrode and the metallic member, so that it is possible to suppress the generation of heat at this contact portion during the welding process. And, because of this, it is possible to prevent damage to the welded portion due to generation of heat from outside the welded portion, and to prevent adhesion between the welding electrode and the metallic member due to melting. This means that the beneficial effects are obtained that it is possible to enhance the productivity, and that it is possible to obtain a joining construction whose reliability is high.

It should be understood that while, in the various embodiments described above, cases in which embodiments of this welded construction according to the present invention were applied to the cylindrical secondary cell 1, the AC generator 200 for a vehicle, and the ignition device 300 for an internal combustion engine were explained, the present invention should not be considered as being limited to these particular devices; it could also be utilized in other applications. Moreover, while in the embodiments described above the type of resistance welding employed for welding the two metallic members together was spot welding, in other cases it would also be acceptable to arrange for seam welding to be employed.

Furthermore, within the scope of the concept of the present invention, the welded constructions shown in FIGS. 1 through 11 may be applied in various altered forms; the essential point is that, in a welded construction in which a first metallic member, on one surface of which a projecting portion is formed and on the other surface of which a depressed portion corresponding to the projecting portion is formed, and a second metallic member are welded together at a welded portion which includes a summit portion of the projecting portion, and that, on at least one of the first metallic member and the second metallic member, on its opposite surface to its surface that faces the other one of the metallic members, a concave portion is formed that is depressed from its peripheral region towards a region which corresponds to the welded portion.

Moreover, in the welding method by resistance welding according to the present invention, a first metallic member, on one surface of which a projecting portion is formed and on the other surface of which a depressed portion corresponding to the projecting portion is formed, and a second metallic member are pressed together with a positive electrode and a negative electrode, and welding is performed at a welded portion which includes a summit portion of the projecting portion, and, on at least one of the first metallic member and the second metallic member, on its opposite surface to its surface that faces the other metallic member, a concave portion is formed that is depressed from its peripheral region towards a region which corresponds to the welded portion, and, during resistance welding, welding is performed without contacting at least one of the concave portions against the positive electrode or the negative electrode.

The above described embodiments are examples and various modifications can be made without departing from the scope of the invention.

What is claimed is:

1. A welded construction in which a first metallic member, on one surface of which a projecting portion is formed and on the other surface of which a depressed portion corresponding to the projecting portion is formed, and a second metallic member are welded together at a welded portion which includes a summit portion of the projecting portion;
    wherein, on at least one of the first metallic member and the second metallic member, on its opposite surface to its surface that faces the other one of the metallic members, a recessed portion is formed that is recessed from its peripheral region towards a region which corresponds to the welded portion; and
    wherein the first metallic member is made from copper, and the second metallic member is made from nickel.

2. A welded construction according to claim 1, wherein the first metallic member and the second metallic member have different resistance values, and a metallic member in which the recessed portion is formed has a larger resistance value than the other metallic member.

3. A welded construction according to claim 1, wherein the recessed portion is formed around the depressed portion of the one metallic member in which the depressed portion is formed.

4. A welded construction according to claim 3, wherein, on the other metallic member, a region that corresponds to the welded portion on its side opposite to its side that faces the one metallic region is planarized with its surrounding region.

5. A welded construction according to claim 3, wherein, on the other metallic member, a region that corresponds to the welded portion on its side opposite to its side that faces the one metallic region is a recessed portion that is recessed from its surrounding region.

6. A welded construction according to claim 1, wherein the recessed portion has a cone-shape.

7. A welded construction according to claim 1, wherein the recessed portion has a hemispherical- or dome-shape.

8. A welded construction according to claim 1, wherein the recessed portion has a groove-shape of constant width and predetermined length.

9. A welded construction according to claim 8, wherein the recessed portion has a shallow groove-shape with a circular cross section.

10. A welded construction according to claim 8, wherein the depressed portion has a groove-shape of constant width and predetermined length and of angle-shape in cross section.

11. A welded construction according to claim 1, wherein the recessed portion has a rectangular-shape.

12. A welded construction in which a first metallic member, on one surface of which a projecting portion is formed and on the other surface of which a depressed portion corresponding to the projecting portion is formed, and a second metallic member are welded together at a welded portion which includes a summit portion of the projecting portion;

wherein, on at least one of the first metallic member and the second metallic member, on its opposite surface to its surface that faces the other one of the metallic members, a recessed portion is formed that is recessed from its peripheral region towards a region which corresponds to the welded portion; and wherein the first metallic member is an electrode collector plate of a secondary cell, and the second metallic member is a power lead that is disposed between a casing of the secondary cell and the electrode collector plate.

* * * * *